US012767106B1

(12) United States Patent
Eles et al.

(10) Patent No.: US 12,767,106 B1
(45) Date of Patent: Oct. 20, 2026

(54) METHOD AND SYSTEM OF AUTOMATED TRAILER BRAKING CONTROL DURING DYNAMIC TRAILERING

(71) Applicant: GM GLOBAL TECHNOLOGY OPERATIONS LLC, Detroit, MI (US)

(72) Inventors: Benjamin J. Eles, Goodrich, MI (US); Klaus Trangbaek, Ein Vered (IL); Zachary Mesplay, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/245,642

(22) Filed: Jun. 23, 2025

(51) Int. Cl.

| | |
|---|---|
| ***B60T 8/58*** | (2006.01) |
| ***B60T 7/20*** | (2006.01) |
| ***B60T 7/22*** | (2006.01) |
| ***B60T 8/17*** | (2006.01) |
| ***B60T 8/171*** | (2006.01) |
| ***B60T 8/172*** | (2006.01) |
| ***B60T 8/1755*** | (2006.01) |

(Continued)

(52) U.S. Cl.
CPC .................................... *B60T 8/58* (2013.01); *B60T 7/20* (2013.01); *B60T 7/22* (2013.01); *B60T 8/1701* (2013.01); *B60T 8/171* (2013.01); *B60T 8/172* (2013.01); *B60T 8/17551* (2013.01); *B60K 35/28* (2024.01); *B60K 2360/178* (2024.01); *B60Q 5/006* (2013.01); *B60T 2230/00* (2013.01); *B60T 2250/03* (2013.01); *B60T 2250/04* (2013.01)

(58) Field of Classification Search
None
See application file for complete search history.

(56) References Cited

U.S. PATENT DOCUMENTS

| | | | | |
|---|---|---|---|---|
| 9,026,311 | B1 * | 5/2015 | Pieronek | B60T 8/1708 280/455.1 |
| 11,951,964 | B2 | 4/2024 | Zengin et al. | |

(Continued)

FOREIGN PATENT DOCUMENTS

| | | | |
|---|---|---|---|
| DE | 102006055365 | A1 | 5/2008 |
| DE | 102007052759 | A1 | 5/2009 |

(Continued)

*Primary Examiner* — Hitesh Patel
*Assistant Examiner* — Elle Rose Knudson
(74) *Attorney, Agent, or Firm* — Ingrassia Fisher & Lorenz, LLP | IFL

(57) ABSTRACT

Methods and systems include monitoring parameters related to a position and motion of a vehicle and a trailer being towed by the vehicle, and monitored by using sensors on the vehicle, the trailer, or both the vehicle and the trailer. The method includes detecting at least one of a plurality of predetermined trailering dynamics conditions, each being associated with a trailer braking algorithm to control trailer and vehicle dynamics relative to each other, and automatically controlling at least one trailer brake of a plurality of trailer brakes of the trailer controlled separately from brakes of the vehicle. The controlling includes having all three available of (1) setting at least one trailer brake ramping rate, (2) setting at least one trailer brake output level, and (3) both (1) and (2). The controlling depends on which of the predetermined trailering dynamics conditions is detected.

17 Claims, 10 Drawing Sheets

(51) Int. Cl.
*B60K 35/28* (2024.01)
*B60Q 5/00* (2006.01)

(56) References Cited

U.S. PATENT DOCUMENTS

| | | | | |
|---|---|---|---|---|
| 2009/0045603 | A1* | 2/2009 | Huntimer | B60D 1/30 280/455.1 |
| 2015/0165850 | A1* | 6/2015 | Chiu | B60D 1/30 701/1 |
| 2016/0251005 | A1 | 9/2016 | Morselli et al. | |
| 2018/0126968 | A1* | 5/2018 | Eckert | B60T 8/323 |
| 2020/0247373 | A1* | 8/2020 | VanAntwerp | B60T 13/662 |
| 2022/0242424 | A1* | 8/2022 | Saenz | B60W 10/06 |
| 2024/0132054 | A1* | 4/2024 | Weston | B60W 30/02 |

FOREIGN PATENT DOCUMENTS

| | | | | |
|---|---|---|---|---|
| DE | 102011010994 | A1 | 8/2012 | |
| DE | 102012000784 | A1 | 7/2013 | |
| DE | 102015215802 | A1 | 2/2017 | |
| DE | 102017010867 | A1 | 5/2019 | |
| DE | 102021129182 | A1 * | 5/2023 | B60T 8/1708 |
| JP | 3570145 | B2 * | 9/2004 | B60T 8/246 |

* cited by examiner

700

800

900

1000

METHOD AND SYSTEM OF AUTOMATED TRAILER BRAKING CONTROL DURING DYNAMIC TRAILERING

INTRODUCTION

The technical field generally relates to vehicles and, more specifically, to automatic methods and systems for controlling vehicle trailer brakes.

Certain vehicles are equipped to tow a trailer during travel and control the brakes on the trailer. Accordingly, it is desirable to provide methods and systems that use the trailer brakes to increase control of trailer dynamics including sway of the trailer.

SUMMARY

In accordance with an example implementation, a method includes monitoring, by at least one processor, parameters related to a position and motion of a vehicle and a trailer being towed by the vehicle, and monitored by using sensors on the vehicle, the trailer, or both the vehicle and the trailer. The method includes detecting, by at last one processor, at least one of a plurality of predetermined trailering dynamics conditions, each being associated with a trailer braking algorithm to control trailer and vehicle dynamics relative to each other, and automatically controlling, by at least one processor, at least one trailer brake of a plurality of trailer brakes of the trailer controlled separately from brakes of the vehicle. The controlling includes having all three available of (1) setting at least one trailer brake ramping rate, (2) setting at least one trailer brake output level, and (3) both (1) and (2). The controlling depends on which of the predetermined trailer dynamics conditions is detected.

Also in an example implementation, at least one of the plurality of predetermined trailering dynamics conditions is a trailer dynamics condition that includes a detection that one or more of the plurality of trailer brakes are saturated, and the controlling includes automatically stopping trailer braking or reducing a brake output level of one or more of the plurality of trailer brakes.

Also in an example implementation, one of the predetermined trailering dynamics conditions is a predetermined trailer dynamics condition that is set to exist when a lateral acceleration of the trailer and a velocity of the vehicle are both over predetermined thresholds, and the controlling includes automatically changing a trailer brake output level or setting a trailer brake ramping rate in response to the predetermined trailer dynamics condition.

Also in an example implementation, wherein the predetermined trailering dynamics conditions is a vehicle instability condition, the trailer braking algorithm is a vehicle stabilization algorithm that provides criteria to determine when to automatically apply at least one of the plurality of trailer brakes to generate a force transmitted from the trailer and to the vehicle resulting in the vehicle moving laterally from an actual yaw and toward an expected yaw of the vehicle.

Also in an example implementation, the criteria includes at least a first threshold of a hitch angle between the trailer and the vehicle and a second threshold of a difference between the actual yaw and the expected yaw of the vehicle.

Also in an example implementation, the trailer braking algorithm is a trailer stabilization algorithm that provides criteria to determine when to stop, start, increase, decrease, or maintain a trailer brake level or a trailer brake ramping rate to shift the trailer laterally toward a centered position that follows a centerline of motion of the vehicle.

Also in an example implementation, the trailer stabilization algorithm causes one or more of the plurality of trailer brakes to be applied depending on a direction of lateral motion of the trailer relative to the centered position.

Also in an example implementation, the trailer stabilization algorithm causes reduction in trailer brake output level or stopping of application of one or more of the plurality of trailer brakes in response to determining the trailer is moving laterally inward toward the centered position, and causes the plurality of trailer brakes to be applied, maintained at an existing trailer brake output level, or applied with an increased trailer brake output level in response to determining the trailer is moving laterally outward away from the centered position.

Also in an example implementation, the trailer stabilization algorithm causes increase in trailer brake output level or stopping of application of one or more of the plurality of trailer brakes in response to determining the trailer is moving laterally inward toward the centered position with a lateral acceleration that will cause the trailer to overshoot the centered position and continue to yaw outward away from the centered position.

Also in an example implementation, the criteria is arranged to factor both a hitch angle between the vehicle and the trailer, and a hitch angle rate that is a difference between a vehicle yaw rate and a trailer yaw rate.

Also in an example implementation, the trailer braking algorithm is a saturation avoidance algorithm that includes computing a saturation threshold as a maximum longitudinal brake force. The controlling includes maintaining trailer brake output levels below the saturation threshold.

Also in an example implementation, the saturation threshold is based on a maximum potential lateral force when a longitudinal brake force is zero.

Also in an example implementation, the saturation threshold is based on a calculated residual force margin derived by subtracting a version of the maximum potential lateral force from a vertical load-dependent combined force capacity, and factoring a longitudinal stiffness value and a cornering stiffness value.

Also in an example implementation, the saturation threshold is arranged to factor a trailer brake factor determined so that the longitudinal brake force is limited to reduction by the trailer brake factor. The trailer brake factor varies depending on a current predetermined trailer dynamics condition.

In another example implementation, a system includes sensors on a vehicle, a trailer being towed by the vehicle, or both that provide data of parameters related to a position and motion of the vehicle; memory; and processor circuitry forming at least one processor communicatively coupled to the sensors and the memory, and being arranged to operate by: detecting at least one of a plurality of predetermined trailering dynamics conditions each being associated with a trailer braking algorithm to control trailer and vehicle dynamics relative to each other. The predetermined trailering dynamics conditions include at least all of: a trailer brake saturation condition, a vehicle unstable condition, a trailer unstable condition, and an evasive maneuver condition. The processor also operates by automatically controlling at least one trailer brake of multiple trailer brakes of the trailer controlled separately from brakes of the vehicle. The controlling includes having all three available of (1) setting at least one trailer brake ramping rate, (2) setting at least one trailer brake output level, and (3) both (1) and (2). The controlling depends on which of the predetermined trailering dynamics conditions is detected.

Also in an example implementation, the at least one processor is arranged to operate by increasing application of one or more of the plurality of trailer brakes to intentionally alter trailer dynamics in distance or force, and to shift the trailer toward a centered position of the trailer aligned with a vehicle path.

Also in an example implementation, the detecting of the predetermined trailering dynamics conditions includes detecting the left or right direction of yaw of the trailer relative to the vehicle, and initiating a trailer brake response differently depending on the detected left or right direction.

In another example implementation, a vehicle is arranged to tow a trailer, and the vehicle includes sensors on the vehicle, the trailer, or both that provide data of parameters related to a position and motion of the vehicle; memory, and processor circuitry forming at least one processor communicatively coupled to the sensors and the memory, and being arranged to operate by: detecting at least one of a plurality of predetermined trailering dynamics conditions each being associated with a trailer braking algorithm to control trailer and vehicle dynamics relative to each other. The predetermined trailering dynamics conditions include at least all of: a trailer brake saturation condition, a vehicle unstable condition depending on a hitch angle and yaw rates of the vehicle, a trailer unstable condition that is different depending on whether the trailer is yawing laterally toward or away from a centered position of the trailer, and an evasive maneuver condition, and automatically controlling at least one trailer brake of multiple trailer brakes of the trailer controlled separately from brakes of the vehicle. The controlling includes having all three available of (1) setting at least one brake ramping rate, (2) setting at least one brake output level, and (3) both (1) and (2). The controlling depends on which of the predetermined trailering dynamics conditions is detected.

Also in an example implementation, the at least one processor is arranged to operate by using a saturation trailer brake output level determined by decreasing trailer brake output levels until tire saturation is observed by using a hitch angle, trailer yaw data, or both. The at least one processor is arranged to operate by using a peak lateral load to determine how much lateral load to reduce from the peak lateral load to avoid the tire saturation, and the peak lateral load is determined by increasing the trailer brake output levels and monitoring reactions of the vehicle and the trailer.

Also in an example implementation, the vehicle includes a display and an audio system. The at least one processor is arranged to announce trailer instability on the display or on the audio system on the vehicle, and when trailer dynamics are detected.

Furthermore, other desirable features and characteristics of the present implementations of disclosed vehicles, methods, and systems herein will become apparent from the subsequent detailed description and the appended claims, taken in conjunction with the accompanying drawings and the background recited above.

DESCRIPTION OF THE DRAWINGS

The present disclosure will hereinafter be described in conjunction with the following drawing figures, where like numerals denote like elements, and where.

DETAILED DESCRIPTION

The following detailed description is merely exemplary in nature and is not intended to limit the disclosure or the application and uses thereof. Furthermore, no intention exists to be bound by any theory presented in the preceding background or the following detailed description.

Figure 1:
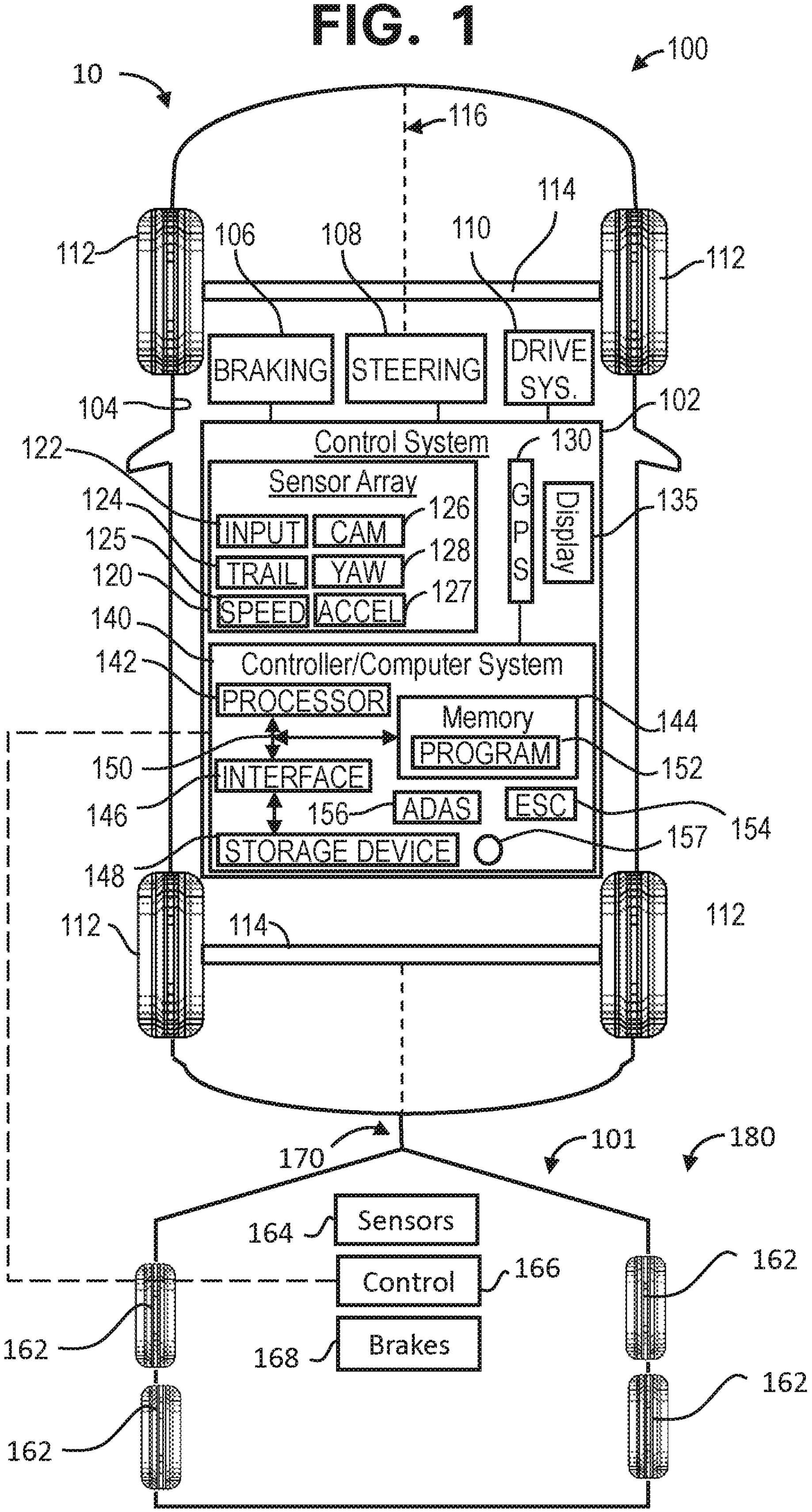
FIG. 1 is a schematic diagram of a vehicle-trailer system according to at least one of the example implementations herein.

Referring to FIG. 1, a vehicle-trailer system 10 (also referred to herein as just a "VT system") is provided according to an example implementation. The vehicle-trailer system 10 includes a vehicle 100 and a trailer 101. In various implementations, the vehicle 100 is coupled to the trailer 101 via a connection apparatus 170, and is configured to tow the trailer 101. In certain implementations, the connection apparatus 170 includes a hitch. In certain other implementations, the connection apparatus 170 includes one or more other types of apparatus system, such as a gooseneck for a fifth wheel trailer, and so on. The hitch 170 and trailer 101 are shown in a centered position 180 without lateral movement.

As described in greater detail below, the vehicle 100 includes a control system 102 for controlling operation and movement of the VT system 10, including with respect to dynamics or lateral motion (or yaw) of the trailer 101 during travel, in accordance with an example implementation.

In various implementations, the vehicle 100 includes an automobile, and may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain implementations. In certain implementations, the vehicle 100 may also include a motorcycle or other vehicle, such as aircraft, spacecraft, watercraft, and so on, and/or one or more other types of mobile platforms (e.g., a robot and/or other mobile platform).

The vehicle 100 includes a body 104 that is arranged on a chassis 116. The body 104 substantially encloses other components of the vehicle 100. The body 104 and a chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one implementation, the vehicle 100 includes four wheels 112, although this may vary in other implementations (for example for trucks and certain other vehicles).

A drive system 110 is mounted on the chassis 116, and drives the wheels 112, for example via axles 114. The drive system 110 includes a propulsion system. In certain example implementations, the drive system 110 includes an internal combustion engine and/or an electric motor/generator, coupled with a transmission thereof. In certain implementations, the drive system 110 may vary, and/or two or more drive systems 110 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, an electric motor, and so forth.

As depicted in FIG. 1, the vehicle also includes a braking system 106 and a steering system 108 in various implementations. In example implementations, the braking system 106 controls braking of the vehicle 100 using braking components that are controlled via inputs provided by a driver (e.g., via a braking pedal in certain implementations) and/or automatically via the control system 102. Also in example implementations, the steering system 108 controls steering of the vehicle 100 via steering components (e.g., a steering column coupled to the axles 114 and/or the wheels 112) that are controlled via inputs provided by a driver (e.g., via a steering wheel in certain implementations) as well as automatically via the control system 102. Also in various implementations, the control system 102 provides automatic braking via the braking system 106.

In the implementation depicted in FIG. 1, the control system 102 is coupled to the braking system 106, the steering system 108, and the drive system 110. Also as depicted in FIG. 1, in various implementations, the control system 102 includes a sensor array 120, a location system 130, a display 135, and a controller or computer system 140.

In various implementations, the sensor array 120 may include sensors that obtain sensor data for to control dynamics of the trailer 101. In the depicted implementation, the sensor array 120 includes input sensors 122 (e.g., brake pedal sensors measuring brake inputs provided by a driver and/or touch screen sensors and/or other input sensors configured to received inputs from a driver or other user of the vehicle 100); trailer sensors 124 (e.g., configured to measure a hitch articulation angle with respect to the trailer 101, and/or in certain implementations, a weight of, and/or other data pertaining to, the trailer 101), speed sensors 125 (e.g., wheel speed sensors and/or other sensors configured to measure a speed and/or velocity of the vehicle and/or data used to calculate such speed and/or velocity), cameras 126 (in certain implementations, configured to capture images of the lane and roadway in which the vehicle 100 is travelling, and in certain implementations for rear facing cameras, data pertaining to the trailer 101, such as a hitch angle at which the vehicle 100 is attached to the trailer 101 via the hitch 170, trailer position, and trailer motion), acceleration sensors 127 (e.g., an accelerometer and/or one or more other sensors for measuring and/or determining an acceleration of the vehicle 100), and yaw sensors 128 (for measuring and/or determining a yaw rate of the vehicle 100). In various implementations, various sensor data, including the hitch articulation angle and yaw rate, are used in monitoring and controlling trailer dynamics in accordance with the operations of the process 300 of FIGS. 3A-3D and described further below.

In one example approach for more detail, the sensor array 120 has a vehicle yaw rate sensor that may be mounted near the vehicle's center of gravity (such as on the floor pan beneath the center console to measures rotational velocity of the vehicle around its vertical axis) to provide data on vehicle turning behavior. A trailer yaw rate sensor (of sensors 164 on the trailer 101) may be provided centrally on a trailer frame to similarly capture the trailer's rotational motion. Optical detection of trailer angle and yaw rate may be implemented by using an optical sensor such as Light Detection and Ranging (LiDAR) or other structured light sensors mounted at the vehicle's rear, and/or gyroscopes, to detect the angle and relative rotation rate of the trailer by tracking reflective markers or contour shapes. Also, vehicle rear radar may be integrated into rear bumper corners for example to measure distances and relative velocity of the trailer or nearby objects. In addition for example, vehicle rear proximity sensors also may be located in the rear bumper and provide short-range distance measurements. In another example, vehicle wheel speed sensors may be installed at each or individual wheel hub to detect individual wheel rotation speeds. The sensor array 120 also may include weight sensors to monitor the weight of the vehicle 100.

In certain implementations, the location system 130 is configured to obtain and/or generate data as to a position and/or location in which the vehicle is located and/or is travelling. In certain implementations, a location system 130 includes and/or or is coupled to a satellite-based network and/or system, such as a global positioning system (GPS) and/or other satellite-based system. Also in certain implementations, the display system 135 provides visual, audio, haptic, and/or other information for a driver or user of the vehicle 100 via instructions provided by the controller 140, including pertaining to the trailer dynamics.

In various implementations, the controller 140 is coupled to the sensor array 120 as well as to the braking system 106. In various implementations, the controller 140 may also be coupled to one or more other vehicle components, such as the steering system 108, the drive system 110, the location system 130, the display 135, and/or other vehicle components.

In various implementations, the controller 140 includes the computer system (also referred to herein as computer system 140), and includes a processor 142, a memory 144 storing at least a program 152 for operating systems on the vehicle and/or trailer 101, an interface 146, a storage device 148, a computer bus 150, an automatic driving system such as an advanced driver assistance system (ADAS) 156, and an electronic stability control (ESC or ESC system) 154. In various implementations, the controller (or computer system) 140 controls vehicle and trailer operation, including monitoring and controlling of trailer dynamics for the trailer 101. In various implementations, the controller 140 provides these and other functions by operating a trailer dynamics control program or system 200 (FIG. 2) that in turn operates the process of FIGS. 3A-3D, and implementations described further below, for example in connection with FIGS. 4A-10.

In various implementations, the controller 140, in certain implementations, may have the same or similar components as the control system 102 or may be the control system 102. The controller 140 is disposed within the body 104 of the vehicle 100. In one implementation, the control system 102 is mounted on the chassis 116. In certain implementations, the controller 140 and/or control system 102 and/or one or more components thereof may be disposed outside the body 104, for example on a remote server, in the cloud, or other device where processing is performed remotely.

It will be appreciated that the controller 140 may otherwise differ from the implementation depicted in FIG. 1. For example, the controller 140 may be coupled to or may otherwise utilize one or more remote computer systems and/or other control systems, for example as part of one or more of the above-identified vehicle 100 devices and systems.

Processor circuitry forms at least one processor 142. The processor 142 performs the computation and control functions of the controller 140, and may include any type of processor or multiple processors, single integrated circuits such as a microprocessor, or any suitable number of integrated circuit devices and/or circuit boards working in cooperation to accomplish the functions of a processing unit. This may include a System on a Chip (SoC) with multiple cores, or any other suitable processor structure. During operation, the processor 142 executes one or more programs 152 contained within the memory 144 and, as such, controls the general operation of the controller 140 and the computer system of the controller 140, generally in executing the processes described herein, such as by using the trailer dynamics control system 200 (FIG. 2) to operate a trailer dynamics control process 300 of FIGS. 3A-3D in implementations described further below.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted implementation, the memory 144 stores the above-referenced program 152 along with map data 154 (e.g., from and/or used in connection with the location system 130) and one or more stored values 156 (e.g., including, in various implementations, threshold values for detecting, reducing, or avoiding trailer brake saturation conditions or trailer dynamics (including sway), and data related thereto such as computed parameters including computed center of gravities of the vehicle and the trailer).

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one implementation, the interface 146 obtains the various data from the sensor array 120 and/or the location system 130. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one example implementation, the storage device 148 includes a program product from which memory 144 can receive a program 152 that executes one or more implementations of one or more processes of the present disclosure, such as the operations of the process 300 of FIGS. 3A-3D and implementations described further below, for example in connection with trailer dynamics control system 200 of FIG. 2. In another example implementation, the program product may be directly stored in and/or otherwise accessed by the memory 144 and/or a disk (e.g., disk 157), such as that referenced below. In one example form, the storage device 148 also may store a vehicle profile, a trailer profile, or both and that have data indicating fixed parameters (relative to a run-time or deployment but may be updated periodically) that may be used for trailer dynamics-related computations such as vehicle and trailer gross (or other) weight, axle configurations and wheelbases, the vehicle-to-trailer hitch geometry and hitch type, the unloaded (and loaded estimate) center of gravity (CG) locations for both the vehicle and the trailer, the length, width, and height of the trailer, the trailer brake type and braking capacity, tire specifications including radius and stiffness for both vehicle and trailer, known mechanical limits of the trailer braking system, and so forth.

The bus 150 can be any suitable physical or logical structure for connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this example implementation is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program 152 and containing computer instructions stored therein for causing a computer processor (such as the processor 142) to perform and execute the program. Such a program product may take a variety of forms, and the present disclosure applies equally regardless of the particular type of computer-readable signal bearing media used to conduct the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain implementations. It will similarly be appreciated that the computer system of the controller 140 may also otherwise differ from the implementation depicted in FIG. 1, for example in that the computer system of the controller 140 may be coupled to or may otherwise utilize one or more remote computer systems and/or other control systems.

Also as depicted in FIG. 1, the vehicle 100 is towing the trailer 101, and the trailer 101 is not particularly limited as to type, model, shape, size, and so forth as long as it has two or more wheels with brakes 168. In this example, the trailer 101 may be hitched to the vehicle 100 by a number of different hitch structures 170 as mentioned above. In certain implementations, the trailer 101 also includes a plurality of wheels 162, as well as one or more sensors or sensor array 164, a control system 166, and/or a braking system 168. In certain implementations, sensors 164 of the trailer 101 may provide sensor data pertaining to the trailer 101 such as for hitch articulation angle (or trailer yaw) as well as a mass and/or weight of the trailer 101. By some forms, cameras may be provided to detect the hitch angle instead of, or in addition to, cameras on the vehicle 100. It will be appreciated that the sensors 164 may have any of the sensors mentioned above for sensor array 120 that also are suitable for the trailer 101.

Also in certain implementations, the control system 166 of the trailer may include a processor and provide certain functions described in connection with the controller 140 of the vehicle 100. Thus, the controller 140 may individually control the brakes 168 including applying a specific trailer brake ramp rate and/or trailer brake output levels individually to each tire or grouped together depending on the brake structure 168 of the trailer 101. Otherwise, one or more of the modules or units of the trailer dynamics control system 200 (FIG. 2) may be operated by the control 166. The control 166 may have memory (not shown) on the trailer as needed to perform such operations.

In addition, in certain implementations, the braking system 168 may provide braking for the trailer 101, and may be any suitable wheel braking system that provides control to the trailer brake ramp rate and output levels. Some possible examples of such trailer brakes 168 may be electric drum brakes (EDB), electric-over-hydraulic disc brakes (EOHDB), electric-over-hydraulic drum brakes (EOHDrB), and air brakes with electronic brake systems (EBS). Many other variations may be used.

Figure 2:
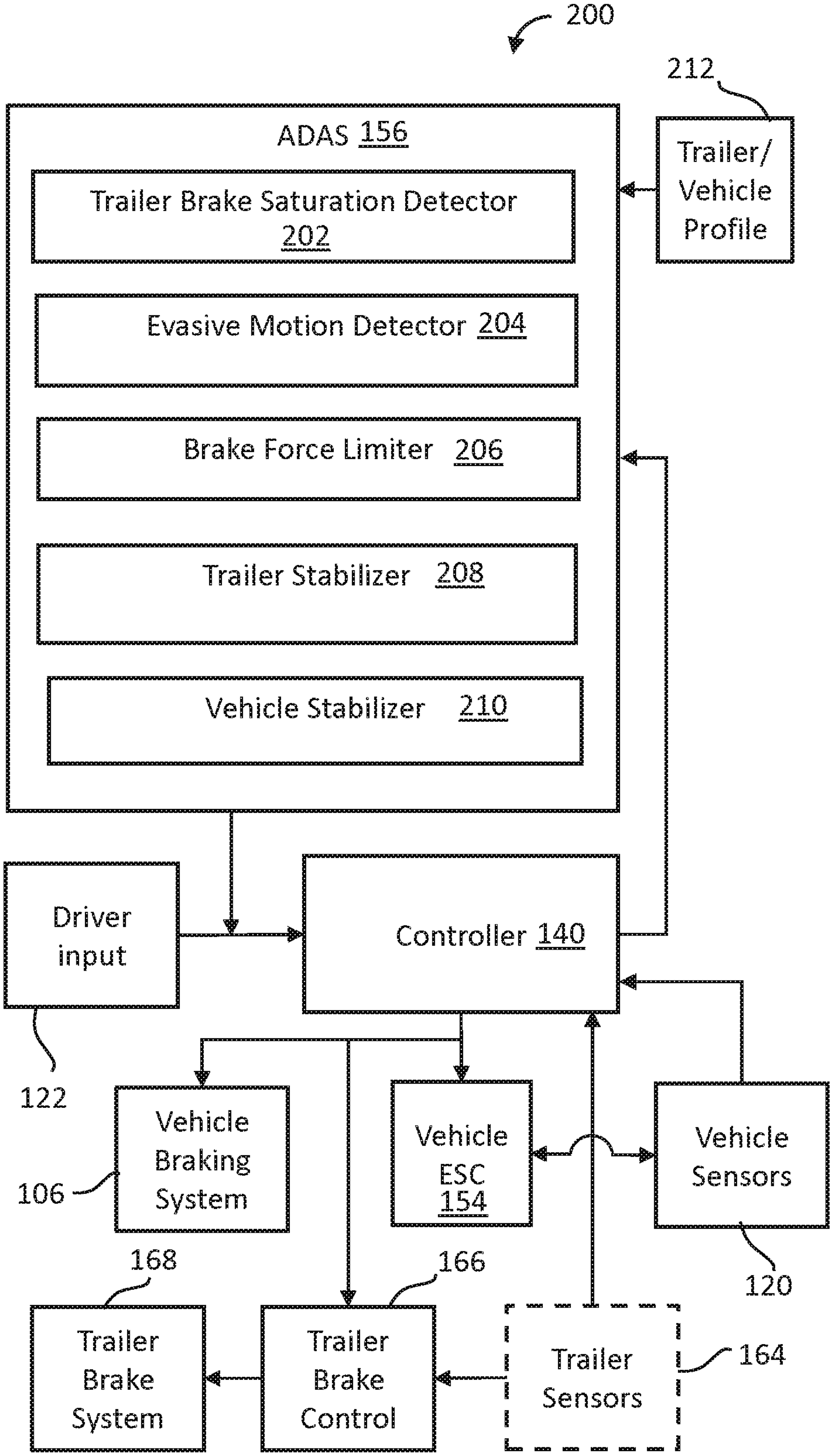
FIG. 2 is a schematic diagram of a trailer brake control system used by the vehicle-trailer system according to at least one of the example implementations herein.

Referring to FIG. 2 for one example implementation, a trailer dynamics control system 200 may have the ADAS 156 and the ESC 154 perform the trailer dynamics control operations of process 300 (FIGS. 3A-3D). The ADAS may have a trailer brake saturation detection unit 202, an evasive motion unit 204, a brake force limiter unit 206, a trailer stabilizer unit 208, and a vehicle stabilizer unit 210. The ADAS may be arranged to receive both vehicle and trailer sensor data and/or parameters as well as trailer and vehicle profile data 212.

The ADAS 156 uses the sensor data to monitor the environment around the vehicle and assist the driver in making decisions. The ADAS 156 may be arranged to include lane-keeping assistance, adaptive cruise control (ACC), steering control (SC), automatic emergency braking, and/or collision avoidance systems in addition to the trailer brake dynamics control system 200 as described herein to improve driving performance and perform evasive maneuvers. By interpreting data from the sensors, the ADAS 156 may provide real-time feedback to the driver and automatically adjustment the vehicle's speed or direction. In the context of towing a trailer, the ADAS 156 may enhance vehicle stability, prevent unintended lane departures, and assist in parking or maneuvering the trailer, ensuring smoother and safer towing operations. The ADAS 156 may be used with any ADAS automation level L1 to fully autonomous L6, and is not limited to any particular level as long as automatic trailer brake control can be implemented as described herein.

The ESC 154 may be used to maintain vehicle stability and better prevent loss of control, particularly during fast, extreme, or evasive driving conditions such as with sharp turns or on slippery roads. The ESC 154 may constantly monitor the vehicle's yaw rate, wheel speed, steering angle, and lateral acceleration to detect situations where the vehicle may begin to lose traction, such as skidding or oversteering. If the ESC 154 detects trailer instability, ESC 154 may automatically apply the vehicle or trailer brakes to individual wheels to reduce the likelihood of a spin-out or rollover. In the context of controlling a trailer's yaw, the ESC 154 may manage the dynamics between the towing vehicle 100 and the trailer 101 by applying targeted braking to the vehicle's wheels, or by adjusting the trailer's braking system, to reduce the risk of undesired lateral motion or yaw, sway, or jackknifing as described below.

The trailer dynamics control system 200 also may be considered to have or include the controller 140 to receive data from both driver input 122 and the ADAS 156, the vehicle braking system 106, the trailer brake control 166, and the trailer brakes 168. The details of the operation of the trailer dynamics control system 200 is provided below with process 300.

Referring to FIGS. 3A-3D, a process 300 of trailer dynamics control is provided according to example implementations herein. In various implementations, the process 300 has operations 302 to 356, generally numbered evenly, and the vehicles, trailers, devices, systems, graphs and so forth of any of FIGS. 1-2 and 4A to 10 may be referred to herein in order to explain process 300.

Process 300 may include "activate the trailer dynamics control system" 302. In this implementation, the system 200 is activated when a vehicle drive or ignition cycle begins, for example when a driver approaches or enters the vehicle 100, or when the driver turns on the vehicle and/or an ignition therefor (e.g. by turning a key, engaging a key fob or start button, and so on), while the vehicle 100 is coupled to the trailer 101. In one implementation, the operations of the process 300 are performed continuously during operation of the vehicle. The activation results in the ADAS 156 receiving vehicle and/or trailer sensor data and profile data. The ADAS 156 performs the operations to monitor the current trailering dynamics conditions including both trailer dynamics conditions and vehicle instability conditions of the VT system 10 and that may indicate a trailer brake saturation currently exists, or that parameters indicate an onset or risk of a trailer brake saturation as well as other dynamics conditions where control of the trailer brakes may in turn control the dynamics of the trailer.

Specifically, process 300 may include "obtain trailer profile parameters" 303, which may include fixed parameters of the trailer or vehicle profile 212 as mentioned above and stored at the storage device 148.

Process 300 may include "monitor trailer and vehicle motion and positions" 304. In various implementations, sensor data is obtained from the sensors described above, and various sensor data of the vehicle 100 and the trailer 101 are obtained via sensors of the sensor array 120 of FIG. 1. In certain implementations, sensor data may also be obtained via trailer sensors 164 of the trailer 101 and may include a hitch articulation angle (HAA) with respect to the trailer 101 (e.g., for the hitch 170) as well as a yaw rate for the vehicle 100. In various implementations, various other sensor data may also be obtained, such as by way of example, inputs from a driver or other user, camera data as to the system 10 and/or roadway on which it is travelling, acceleration of the vehicle 100 and/or trailer 101, mass, weight, and/or other measurements of the vehicle 100 and/or trailer 101, speeds and/or accelerations of the vehicle 100 and/or trailer 101, and so on including any of the parameters mentioned below that are determined by using sensors. The sensor data then may be provided to the processor 142 of FIG. 1 for processing, and for making determinations and implementations for the remaining operations of the process 300, including for monitoring and controlling trailer dynamics for the trailer 101, for example as described below.

In various implementations, the trailer is monitored for trailer dynamics. Specifically, the processor 142 of FIG. 1 monitors dynamics of the trailer 101 using the sensor data obtained from the sensor array 120 of FIG. 1. In various implementations, the trailer dynamics is monitored using a hitch articulation angle with respect to the trailer 101 as well as the yaw rate for the vehicle 100. In certain implementations, other sensor data may also be used to monitor the trailer dynamics. The sensed data and the profiles may be used to compute parameters by any of the sensor units 120 or 164, the controller 140, the ADAS 156, the ESC 154, or other units. These parameters may establish the actual or real-time trailering dynamics conditions or states (or trailer dynamics conditions) of the vehicle and trailer. The parameters also may be used to compute expected or desired (or target) states or conditions of the vehicle, trailer, tires, and so forth.

Figure 3A:
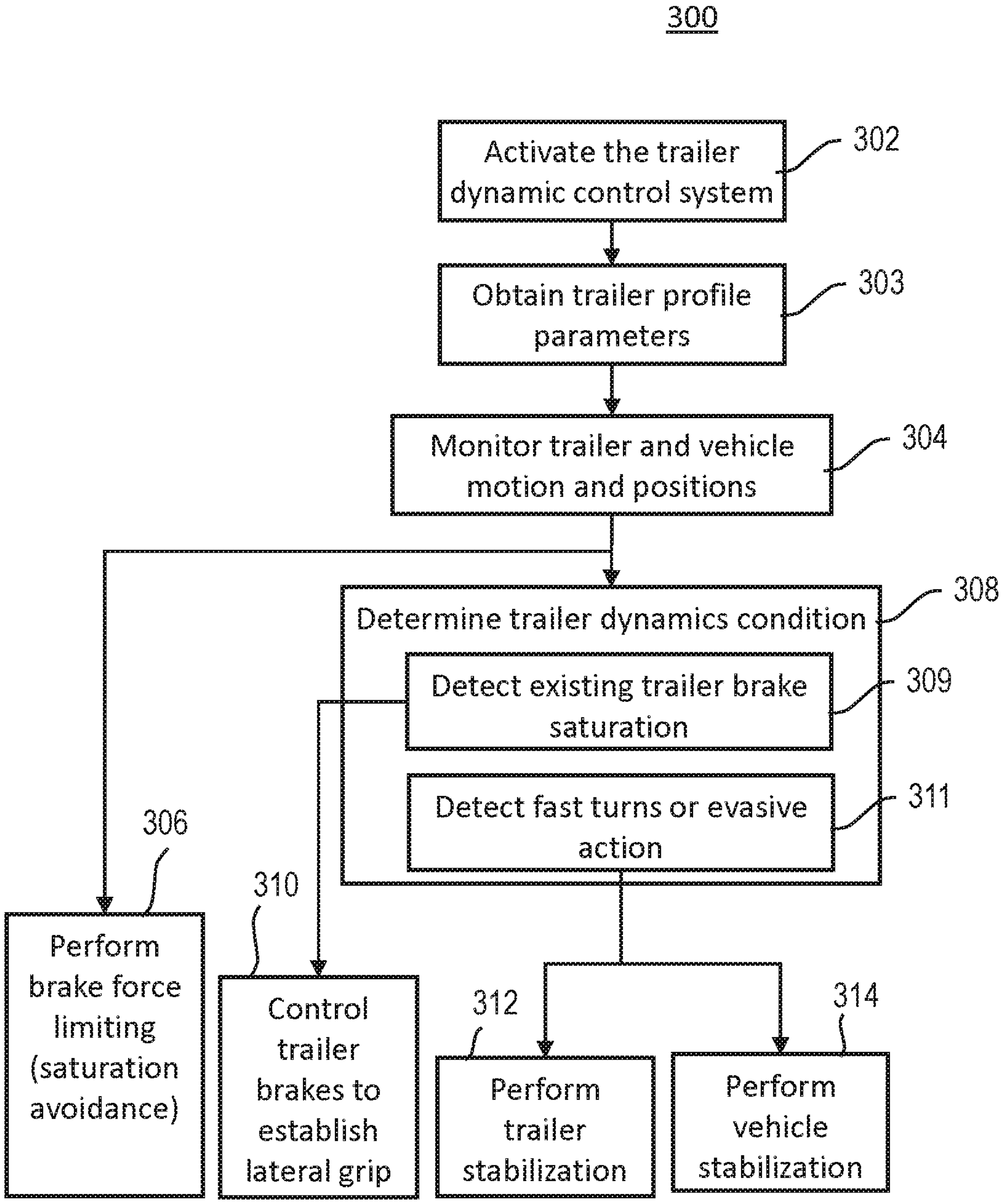
FIGS. 3A-3D is a flowchart of a method of dynamically controlling trailer brakes to control trailer dynamics according to at least one of the example implementations herein.
Figure 3B:
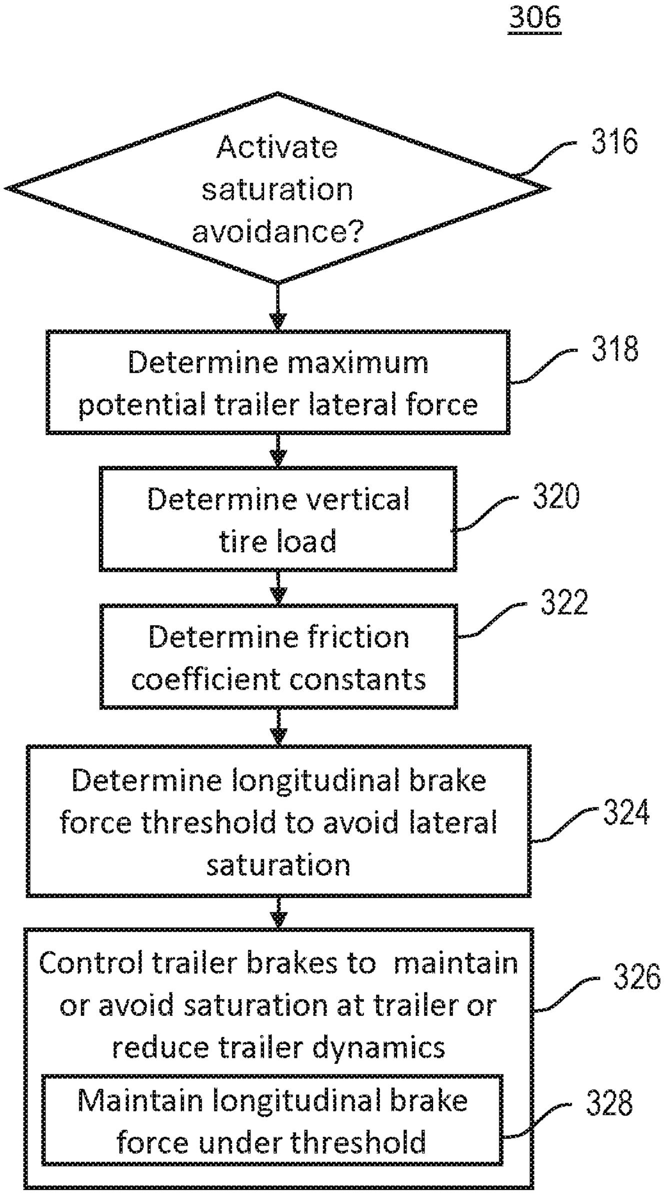
Figure 3C:
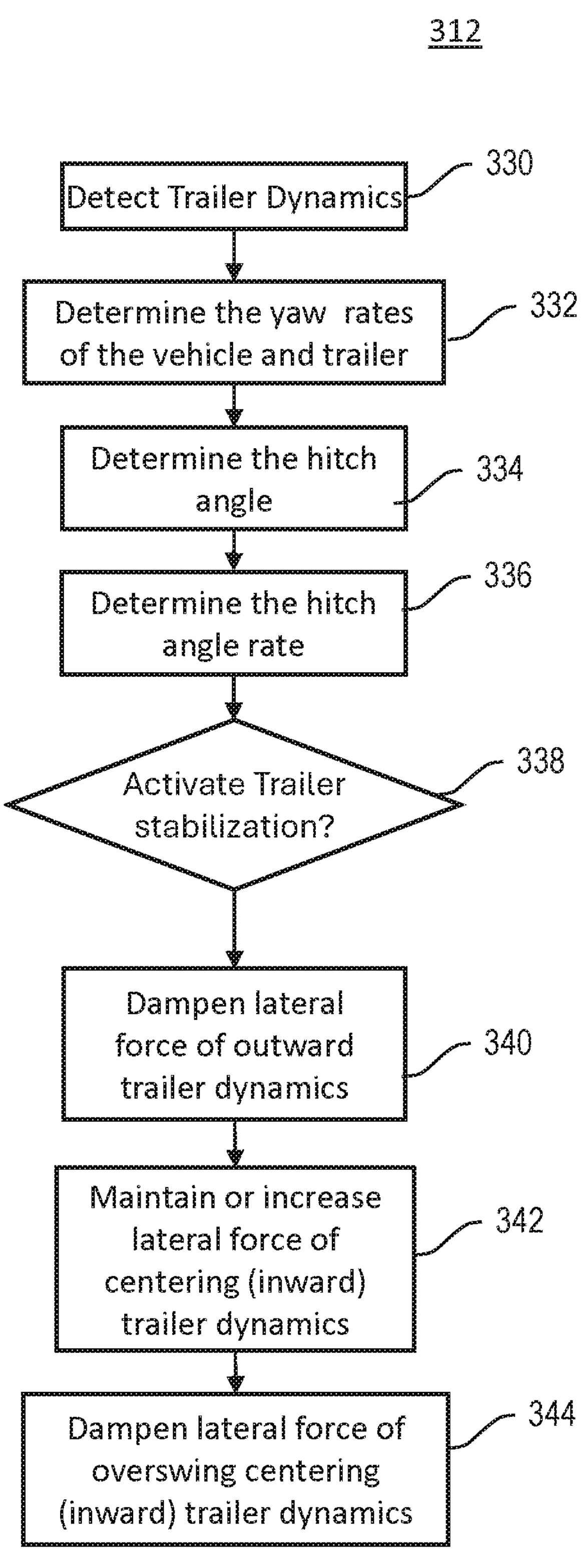
Figure 3D:
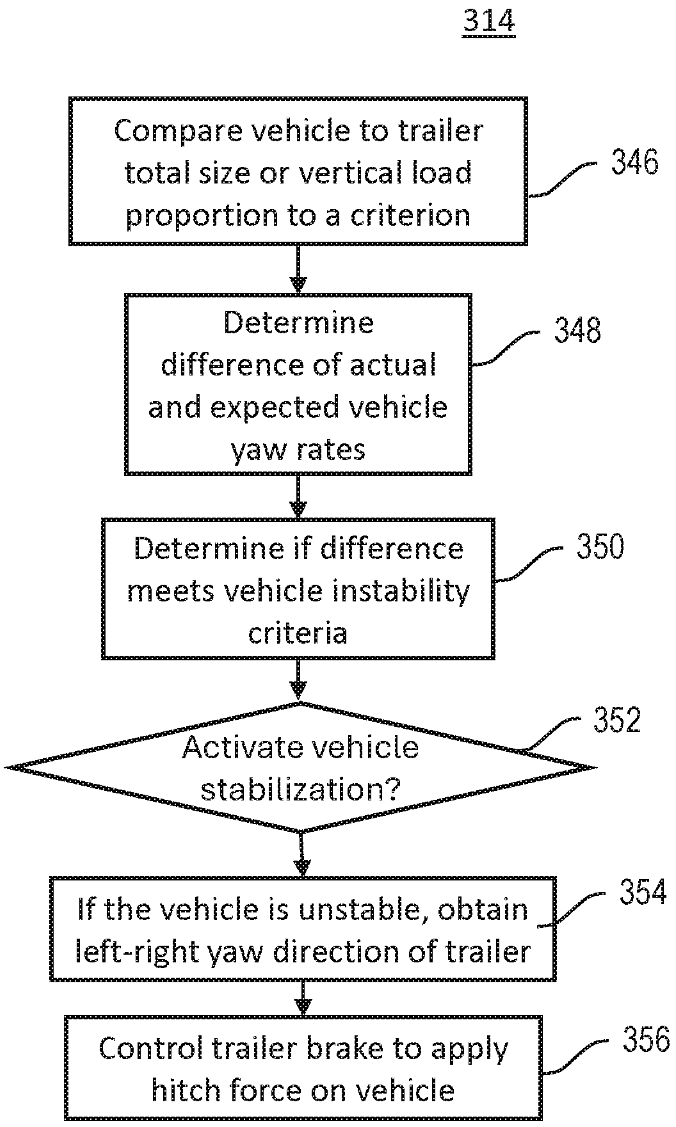

As an overview, and once the vehicle 100 and/or trailer 101 are being monitored for indications of trailer dynamics, a number of techniques may be employed to better control the trailer dynamics. First, the brake force limiter unit 206 may implement a preventative procedure to avoid trailer brake saturation altogether. Thus, process 300 may include "perform brake force limiting (saturation avoidance)" 306 provided in detail at operations 316-328 (FIG. 3B).

Before providing the details of the saturation avoidance 306, process 300 also may provide "determine trailering dynamics condition" 308, and in this example is a trailer dynamics condition where the condition or situation of potential or actual (existing) trailer dynamics is detected by the trailer brake saturation detector 202 in order to know how to control the trailer brakes to reduce or eliminate the trailer dynamics and/or trailer brake saturation.

Thus, process 300 may include "detect existing trailer brake saturation" 309, and again by the trailer brake saturation detector 202. While the HAA and vehicle and trailer yaws may be used to determine the existence of the trailer dynamics, detection of the saturation itself may be detected by a comparison of brake command versus deceleration response, as one example. Here, the system compares the brake command (e.g., voltage, pressure, or current to the trailer brake actuator) with the resulting measured deceleration of the trailer (inferred through vehicle dynamics or direct trailer sensors). If the braking command increases but the deceleration does not (or plateaus), it indicates saturation. Wheel speed behavior or trailer wheel speed sensors may detect when wheels are no longer decelerating effectively, or if wheel slip (or loss of traction) increases beyond a threshold. An excessive slip ratio can indicate the trailer brakes have exceeded available traction (or saturated). Also, brake temperature monitoring may be used (if available) to monitor brake drum or disc temperature, where rapid temperature rise or sustained high temperatures without proportional deceleration implies thermal saturation. Other methods may include monitoring the current and/or voltage to a brake actuator for electric or electro-hydraulic trailer brake systems. A plateau in braking force despite increasing actuator input indicates actuator or friction saturation. Also, vehicle-trailer force estimation may be used that involves using vehicle dynamics models where the system can estimate the longitudinal force applied at the hitch point. If the requested brake force exceeds what is physically transmitted through the hitch, saturation is inferred. Once saturation is detected as the trailer dynamics condition, process 300 may include "control trailer brakes to establish lateral grip" 310 also to be operated by the trailer brake saturation detector 202. The details for this process are provided.

By one example option, the detection of other trailering dynamics conditions may include the operation "detect fast turns or evasive action" 311 performed by the evasive motion detector 204. Here, certain situations occur when a vehicle towing a trailer makes fast turns such as to change lanes to avoid a vehicle ahead for example. Such evasive conditions may result in trailer dynamics and/or saturation more often. These detection conditions of trailer dynamics may or may not establish trailer brake saturation. This also may include detecting when the vehicle tires have reached saturation, and the vehicle is laterally "unstable" while the trailer remains stable ("vehicle instability condition"). Herein, the ESC 154 may activate in these evasive situations to control the vehicle and trailer brakes and trailer dynamics. The saturation and trailer dynamics detection are as explained above with operation 304 and 309.

It should be noted for a different approach, however, that the following trailer brake processes to control trailer dynamics may be performed whether or not evasive action was detected.

Continuing with the evasive detection example here, the ESC 154 may determine an evasive action is taking place by analyzing rapid changes in steering wheel angle, elevated yaw rate, and increased lateral acceleration that deviate significantly from typical driving patterns at the current vehicle speed. These inputs may be evaluated in combination to identify sudden and sharp directional changes indicative of emergency maneuvers. The thresholds used by the ESC 154 may be adjusted for the presence of the trailer. If the observed yaw rate and lateral acceleration exceed expected values for the given steering input and speed—especially if the trailer exhibits delayed or amplified trailer dynamics (or sway) responses—the ESC 154 infers that the driver is performing a rapid evasive maneuver, triggering additional stability and dynamics control actions tailored for towing scenarios. If the ADAS 156 is performing the maneuver, then evasive threshold indicators may be provided automatically to the ESC 154.

Thus, the determining of a dynamic trailering trailer condition also may include identification of which of the vehicle and trailer are actually yawing (or moving laterally) or moving laterally or in brake saturation, the direction of the yaw (or position of the trailer) to the left or right of the vehicle, as well as the amount of yaw (by the HAA or measured yaws, for example). The yaw direction may be detected by cameras or other sensors mentioned above.

When it is determined that the trailer is yawing and is unstable, process 300 may include "perform trailer stabilization" 312, which may be performed by the trailer stabilizer unit 208. This may involve treating the trailer yaw as having a pendulum action and applying different trailer braking depending on the inward or outward lateral direction of the yaw relative to a centered position of the trailer. This may or may not be an actual sway with oscillation. The details for the trailer stabilization are provided with operations 330-344 (FIG. 3C) below.

Process 300 may include "perform vehicle stabilization" 314, and performed by the vehicle stabilizer unit 210. Here, as one example, the vehicle control system has a desired (or expected or target) yaw rate. If the difference between actual and desired yaw rate is above a threshold, the ESC 154 may urge the vehicle to turn in a desired direction by applying the trailer brakes so that the trailer acts as a parachute or anchor to stabilize the vehicle. The details for the vehicle stabilization are provided with operations 346-356 (FIG. 3D) below.

Figure 4A:
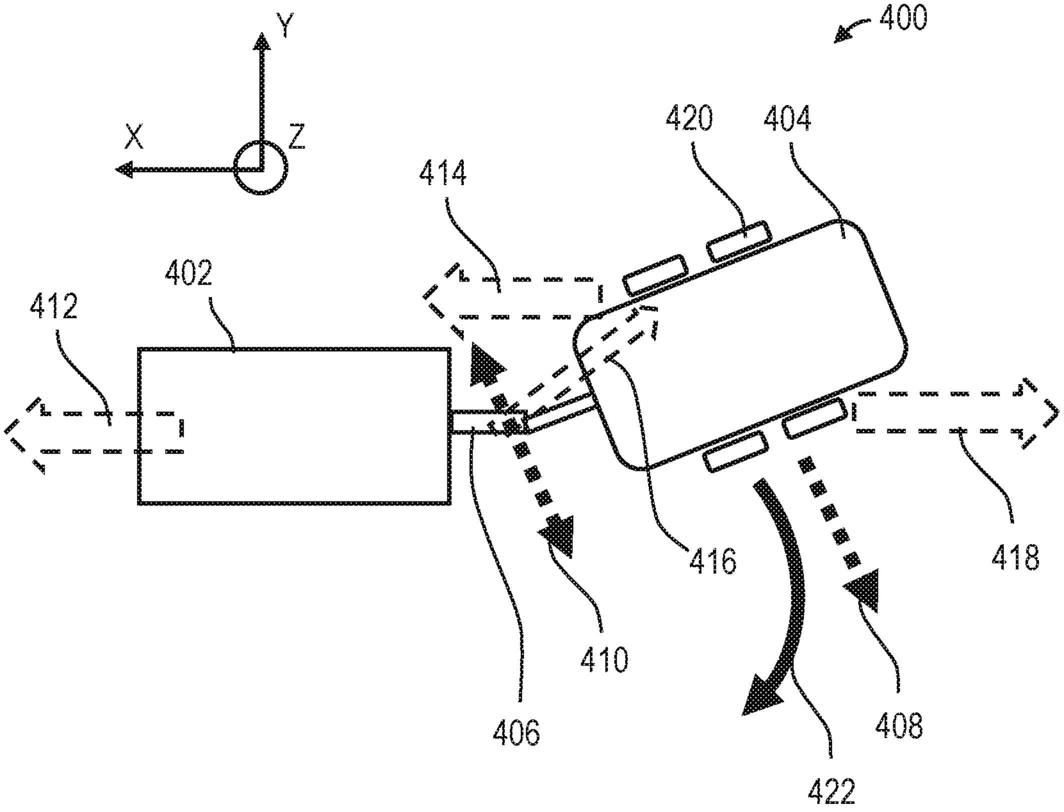
FIG. 4A is a schematic diagram showing a vehicle pulling a trailer to explain trailer brake saturation avoidance according to at least one of the example implementations herein.

Referring to FIG. 4A for more detail, a VT system 400 shows alternative trail dynamics conditions. For example, when both the vehicle 402 and trailer 404 are moving forward as shown by arrows 412 and 414, then a hitch 406 imparts a lateral force 410 on the trailer 404, such as during a turn, and trailer wheels 420 on the trailer 404 apply a lateral force 408 on the ground thereby keeping the trailer 404 aligned with the vehicle 402. When the trailer's brakes are applied, however, the tire force 418 is rearward so that the trailer applies a rearward longitudinal force 416 on the hitch 406 and vehicle 402. In this case, while the tire force 416 is rearward, the lateral force 408 is reduced due to the circle of forces, and when saturation is reached, the trailer performs a yaw (arrow 422) which may be uncontrolled or intentional by the system 200 as explained below.

Returning to operation 310 for more detail, and when a saturation dynamics condition exists as shown by trailer dynamics or yaw arrow 422, the process 300 decouples the trailer brake output from the vehicle brake outputs, thereby activating or deactivating according to an active trailer dynamics control strategy rather than tied brakes. This permits the ADAS 156 or ECS 154 to control the trailer brakes at specific ramp rates and brake output levels or percentages during ADAS or ECS maneuvers that may optimize yaw rate and lateral stability. Thus, this selective trailer brake strategy uses existing active sensor signals and the hitch articulation angle to better ensure the trailer remains closer to, or at, directly behind the vehicle and aligned with the vehicle for increased stability.

The ADAS 156 and ECS 154 may perform dynamic controlled, selective activation of trailer brakes to reduce trailer dynamics or prevent the trailer from deviating from the vehicle's trajectory, thereby reducing the risk of the trailer sliding or jackknifing. By controlling the trailer brake ramp rate and application of the trailer brakes at a certain output level or percentage, trailer stability is improved. Trailer brake ramp rate is how quickly the trailer brake force increases over time when commanded. The trailer brake ramp rate increases gradually (in a controlled "ramp") to avoid jerky or unstable braking. When the ramp rate is too fast, however, this can cause wheel lockup, while a ramp rate that is too slow may be too late to provide timely trailer braking. The ramp rate may be measured as a system or actuator pressure in bar per second or psi per second for hydraulic brake systems, psi per second for pneumatic brake systems, and % of full braking torque per second, or Nm/sec for regenerative or electric systems.

In these cases, the trailer brake saturation detector 202 and/or the ADS 156 and ESC 154 provides the trailer braking commands in the form of braking signals to the vehicle controller 140, which then sends signals to have the trailer brake control 166 control the trailer brakes accordingly.

Referring to FIG. 3B now and again for process 306 to "activate saturation avoidance" 316, whereby the process 306 is provided to attempt to avoid trailer brake saturation in the first place, and may be run continuously, and by one form, even when the other trailer dynamics control operations are being operated simultaneously. This operation may be activated as mentioned with operation 302, but here, in one example form, without any detection of a specific trailering dynamics condition or trailer dynamics condition. By other examples, the saturation avoidance operations may be triggered by such conditions, such as to only operate during evasive maneuvers for example. Many variations exist.

Generally, the trailer brake level, and in turn trailer brake longitudinal force may be limited in order to avoid trailer brake saturation. To understand how controlling the trailer brakes controls the trailer dynamics and in turn saturation, this involves an understanding of the circle of forces mentioned above.

Preliminarily for any of the trailer dynamics-related computations, the trailer can have two, four, or six tires for the example below, but it is assumed the tires are positioned so closely to each other on one side that the tires can be treated as a single tire on a side of the trailer. All discussions below of tire forces then refer to the collective forces of all trailer tires and velocities refer to averages. Note that with this assumption, the system and process ignore torque that may be countering yaw rotation, which may occur due to the separation of the tires. Otherwise, it will be understood that the operations disclosed herein can be adapted for any trailer wheel and/or axle configuration.

More particularly now, the circle of forces (also referred to as a traction circle, friction circle, or friction ellipse) is based on the concept that a tire generates a horizontal force F where it meets the road surface by the mechanism of slip. The circle has a wheel and vehicle at its center, and the vehicle is oriented to travel horizontally from right to left (see the coordinates on FIG. 4A) and along the x axis. The circle defines the outermost available magnitudes of F so that generally:

$$F=F_x+F_y \tag{1}$$

where $F_x$ is a longitudinal braking force (plus other factors) and $F_y$ is the lateral force at the tire and that are the components of total friction force F. Thus, while the magnitude of F is limited by (or at) the circle of forces, the force F can be any combination of the components $F_x$ and $F_y$ that does not extend beyond the circle (which may be an ellipse).

Without saturation, the lateral force $F_y$ is roughly proportional to the lateral velocity as follows:

$$F_y=c\cdot V_y/V_x \tag{2}$$

where $V_y$ is lateral velocity, $V_x$ is longitudinal velocity, and c is a friction coefficient specifically a lateral linear cornering stiffness. The longitudinal force $F_x$ is proportional to a longitudinal slip ax, such that:

$$F_x=d\cdot \alpha x \tag{3}$$

where d also is a friction coefficient, specifically longitudinal stiffness. The longitudinal slip αx is generally given as a percentage of the difference between the surface speed of the wheel compared to the speed between axle and road surface. When applying the trailer brakes, longitudinal slip αx, and hence $F_x$, will be negative (positive is forward relative to the longitudinal axis of the trailer). Also, the friction coefficients c and d depend on tire and road surface properties.

Saturation occurs when the lateral and longitudinal forces approach an upper limit:

$$e\cdot F_y^2+f\cdot F_x^2<F_z^2 \tag{4}$$

where $F_z$ is a vertical tire load, and e and fare tire scaling coefficients. This vertical tire load limit is relative to a vertical tire load that cannot be exceeded even if $V_y$ or αx increase. Thus, if longitudinal force (squared)

$$F_x^2$$

is increased because of braking, lateral force $$F_y^2$$

will be reduced according to the vertical tire load limit, and may even be reduced to zero.

Referring to FIGS. 5-10 as an example of the effect of the circle of forces, graphs 500, 700, and 900 are for a light trailer, while graphs 600, 800, and 1000 are for a heavy trailer, and demonstrate the circle of forces concept. Graphs 500 and 600 show longitudinal braking force over a braking duration starting at a time point 502, while graphs 700 and 800 show corresponding longitudinal speed, the time point when the trailer brakes cause saturation and the wheels are blocked (or locked), and a time point when the brake is released and the wheels return to speed. Graphs 900 and 1000 show corresponding lateral force during the braking in graphs 500-800, and show that the lateral force is reduced to near zero when the brakes are strongly applied at a time point 902. Also, when the brakes are released at 50 seconds, a rotational inertia of the wheels is shown to result in a delay 'a' before the return of lateral force on graph 700 for example.

Now to continue with determining a longitudinal force $F_x$ limit to avoid saturation, the lateral force $F_y$ is a result of lateral motion and cannot be directly controlled except through saturation (see below), while longitudinal force $F_x$ is a function of longitudinal slip, which can be generated by braking. Also, physically, the tire forces are limited by the (approximate) equation:

$$F_y^2 + c \cdot F_x^2 < D \tag{6}$$

where:

$$D = d \cdot F_z^2 \tag{7}$$

where D is the total available frictional force capacity of the tire.

Now assume that $F_y = F_{y0}$, where $F_{y0}$ is a potential maximum lateral tire force, assuming longitudinal braking force $F_x = 0$. Thus, the maximum lateral force $F_{y0}$ occurs when there is no longitudinal braking force $F_x$. Now when a trailer brake is applied, a longitudinal slip increases and $$F_x^2$$

increases. Thus, as long as:

$$F_{y0}^2 + c \cdot F_x^2 < D \tag{8}$$

is true, lateral force $F_y$ will be unchanged.

If on the other hand saturation is reached, then $F_y$ will be reduced by the following which permits the trailer to move more laterally and increase the lateral slip angle.

$$F_y^2 = D - c \cdot F_x^2 \tag{9}$$

$$\text{If } F_x^2 = D/c, \text{ then } F_y = 0 \tag{10}$$

One specific example implementation would be to limit brake force to never reduce $F_y$. In this case, the allowable longitudinal brake force $F_x$ is limited according to a threshold condition to prevent tire saturation and preserve lateral force capability during cornering. This condition is expressed as:

$$F_x^2 < \left(D - F_{y0}^2\right)/c \tag{11}$$

where D is defined above at equation (7), and longitudinal stiffness d here reflects the combined tire-road friction characteristics and the tire's ability to generate force under load, while the lateral linear cornering stiffness coefficient c represents a longitudinal scaling or stiffness factor that governs how the remaining available force (after accounting for lateral demand) is translated into allowable longitudinal force. The inequality ensures that the applied longitudinal brake force does not exceed the residual tire capacity after lateral force demands have been considered, thereby maintaining stability and avoiding loss of lateral grip due to friction saturation.

With the application of the longitudinal force limitation equation (11), process 300 may include "determine maximum potential lateral force" 318. Here the maximum potential lateral force $F_{y0}$ may be predetermined during testing for a specific trailer (or VT system) setup. The testing may involve slowly ramping trailer brake force and profiling the vehicle combination at various speeds and other various conditions to determine the peak lateral load when the brakes are not applied for example.

Process 300 may include "determine vertical tire load" 320, and this may be determined by weight sensors on the trailer. Process 300 may include "determine coefficient constants" 322, where lateral coefficient c may be determined by empirically, via controlled tire testing on a flat belt or drum rig, measuring lateral force at small slip angles. Also, vehicle tests may be used with instrumented vehicles and system identification methods (estimating the lateral coefficient c from measured yaw rate, lateral acceleration, etc.). The lateral coefficient c also may be approximated in simple linear models by using vehicle behavior (e.g., understeer gradient, steady-state cornering). Coefficient d may be determined by empirical tire testing, where the tire is spun or braked under controlled load and slip conditions, or otherwise may be inferred from braking or acceleration tests on vehicles, such as with ABS development or traction control testing.

Process 300 may include "determine longitudinal brake force threshold to avoid lateral saturation" 324, where the equation (11) is now ready to be used during a run-time or deployment.

In an alternative example implementation to equation (11), the brake force here is limited to not reduce $F_y$ by more than a trailer brake factor b.

$$F_x^2 < \left(D - b^2 \cdot F_{y0}^2\right) / c \quad (12)$$

In yet another alternative implementation, the trailer brake factor b for equation (12) is varied dynamically between 0 and 1, according to the vehicle and trailer motion situation (or in other words, the trailering dynamics condition or trailer dynamics condition). The brake factor b values are determined by experimentation.

As to the measurement of the forces $F_x$ and $F_y$, these force variables may not be directly available, and may be estimated by the use of observers and models. For instance, $F_x$ and $F_y$ can be estimated from vehicle IMU measurements as well as a measure of hitch angle described below. The quality of these estimates may depend on the accuracy of the vehicle and trailer model parameters such as the trailer mass and yaw inertia.

Process 300 now may include "control trailer brakes to maintain or avoid saturation at trailer or reduce trailer dynamics" 326, and this may include "maintain longitudinal brake force under threshold" 328. For this restriction alone, the operation of the trailer brakes, with regard to the brake output level or the trailer brake ramp rate, is not limited as long as the output level generates a longitudinal force that remains under the threshold.

For example, the trailer brakes may be applied to perform a controlled trailer brake ramping that may reduce or avoid sudden longitudinal force $F_x$ spikes and preserve at least some minimum lateral force $F_y$ to avoid saturation. This may involve the use of pulse-width modulation (PWM) or ramped torque request signals, rate limiters in software and/or hardware to avoid step changes in braking torque, adapt the ramping rate to monitored vehicle states or parameters (yaw, lateral acceleration, etc.) to adapt the ramp rate at least for trailer stability assist or dynamics mitigation. Brake pulsing may be performed to avoid upsetting the friction circle (exceeding combined Fx+Fy limits) and lateral force $F_y$ recovery between pulses. Braking also may be provided to individual wheels of the trailer as desired to provide a certain average level of longitudinal force, or to have specific tires on the trailer with targeted forces that vary from tire to tire. The implementation of the trailer braking may be performed by having the brake force limiter unit 206 monitor the trailer braking by the ADAS 156 and the driver input 122, and then blocking trailer braking that may cause the saturation while permitting trailer braking signals that will not cause the saturation. In the latter case, the brake force limiter unit 206 permits trailer braking signals to the vehicle controller 140, which then sends signals to have the trailer brake control 166 control the trailer brakes appropriately.

Returning now to the trailer stabilization process 312 (FIG. 3C), process 300 also may include "detect trailer dynamics" 330 in order to determine whether the trailer is unstable. The trailer dynamics are detectable as mentioned above with operation 304. One other way to detect trailer dynamics is to compare the trailer motion to a stable trailer reference model driven by the vehicle motion as an input. If the trailer motion deviates too much from the model, then the strategy can be applied. By one example form, this strategy should only be employed when trailer dynamics or drift is occurring as detected by the techniques mentioned above. The following, however, are other parameters used to detect trailer instability.

Process 300 may include "determine the yaw rates of the vehicle and trailer" 332, and if not already detected at operation 304 by using yaw rate sensors.

Process 300 may include "determine the hitch angle" 334, where an angle θ is set as the detected or actual hitch angle also as discussed above with operation 304 and that is positive for a trailer yawing to the left side of the vehicle.

Process 300 may include "determine the hitch angle rate" 336. A time derivative of hitch angle θ (or rate of change of hitch angle θ) is $\dot{\theta}$ and that is a measure of how quickly the trailer is pivoting relative to the towing vehicle. In a 2D planar model (neglecting vertical dynamics), $\dot{\theta}$ depends on the yaw rate of the trailer ($r_t$), and the yaw rate of the towing vehicle ($r_v$). Assuming small angles and that both yaw rates are measured about their respective centers of gravity (CGs), the time derivative $\dot{\theta}$ is:

$$\dot{\theta} = r_t - r_v \quad (13)$$

The hitch angel θ and the yaw rates for the time derivative $\dot{\theta}$ may be measured directly as described above.

Once the hitch angle and time derivate are obtained, the trailer dynamics are then considered as an oscillating pendulum, similar to a true sway, to determine the inward or outward direction of the lateral or yaw dynamics and relative to a left-right (or lateral) centered position (such as centered position 180 (FIG. 1)) of the trailer 101 in desired alignment behind the vehicle 100 such as centered on a centerline of travel of the vehicle (or directly behind the vehicle or along the path of the vehicle), for example. Thus, the centerline may be straight or curved. With this arrangement, the ADAS 156 or ESC 154 can control the trailer brakes. The inward and outward motion of the trailer during lateral trailer dynamics raises three different dynamics situations or conditions that each warrant a different lateral force $F_y$ response: (1) the trailer is moving or yawing outward from the centered position and toward an outermost or outer yaw position, (2) the trailer is swing or yawing inward from an outer yaw position toward the centered position when the current lateral force of the yaw is decelerating but may not have a lateral force strong enough for the trailer to reach or stop at the centered position, and (3) the trailer is yawing or swinging inward toward the centered position, but the current lateral force of the yaw is too strong and the trailer will overswing the centered position by a significant trailer dynamics (or yaw) distance or yaw angle. The ADAS 156 and/or ESC 154 may detect these motions and then control the trailer brakes to apply a different lateral force $F_y$ to the trailer depending on the motion (1), (2), or (3) to eventually dampen the oscillation and maintain the trailer at the centered position.

In order to first detect the inward or outward direction of the trailer yaw, this may involve determining an hitch yaw direction indicator H and comparing it to zero or other threshold where:

$$H = \theta \cdot \dot{\theta} > 0 \quad (14)$$

If true that H is less than zero, this indicates the trailer is yawing outward (whether to the left or right).

In contrast, when the trailer is yawing back inward toward the centered position or centerline of the vehicle's path, whether from the left or right of the vehicle, then:

$$H = \theta \cdot \dot{\theta} < 0 \quad (15)$$

Process 300 then may include the inquiry "activate trailer stabilization" 338, and when the yaw is both detected and the lateral direction (inward or outward) of the yaw is detected, the trailer is unstable and the appropriate lateral force strategy may be performed.

Thus in trailer dynamics condition (1), when the trailer is yawing outward relative to the centered position, process 300 may include "dampen lateral force of outward trailer dynamics" 340, and more brake force (more longitudinal force $F_x$) is applied to the trailer brakes to reduce or dampen the lateral force $F_y$, and the strength of the yaw to thereby stabilize the trailer dynamics or yaw.

Alternatively in trailer dynamics condition (2), once it is detected that the trailer is yawing from an outer or outermost lateral yaw position and back toward the centered position, and is decelerating or may stop at the centered position, process 300 then may include "maintain lateral force of centering (inward) trailer dynamics" 342, and the lateral force $F_y$ should be maintained by holding the trailer brake longitudinal force $F_x$ constant only during the inward yaw. Otherwise, if it is detected the lateral force $F_y$ is not strong enough for the trailer to reach the centered position, the lateral force $F_y$ may be strengthen slightly by slightly reducing the trailer brake force $F_x$.

With this arrangement, the trailer brakes are controlled so that the lateral force $F_y$ will be maintained at times when the lateral force $F_y$ dampens yaw, and reduced when lateral force $F_y$ does not dampen the yaw. Thus, the timing of the application of the trailer brakes is carefully controlled to apply mostly when, or only when, the application of the longitudinal force $F_x$ will result in dampening the trailer dynamics, and may remain unused when the non-use of the trailer brakes also will contribute to reducing the trailer dynamics by permitting the yaw to decelerate on its own.

With regard to trailer dynamics condition (3), process 300 also may include "dampen lateral force of overswing centering (inward) trailer dynamics" 344. In this trailer dynamics condition, the ADAS 156 and/or ESC 154 detect that the trailer is yawing inward toward the centered position but that the trailer is yawing due to a lateral force $F_y$ that is too strong and will cause a significant overswing so that the trailer will swing passed the centered position toward or to the opposite side of the vehicle. In this case, the trailer brake force $F_x$ may be increased to lower the lateral force $F_y$ and significantly dampen the yaw or lateral dynamics. Application of the trailer brakes may be performed by having the trailer stabilizer unit 208 and/or the ADAS 156 and ESC 154 provide braking signals to the vehicle controller 140, which then sends signals to have the trailer brake control 166 control the trailer brakes accordingly.

The applied trailer brake output levels, and corresponding trailer brake force, as well as desired trailer brake ramp rates, may be predetermined by experimentation, whether model testing, road tests, or some combination thereof.

Turning now to the vehicle stabilization process 314 (FIG. 3D), this strategy considers the trailer brake influence on vehicle motion. For this operation, a vehicle driver may provide input (by steering and/or braking) to a reference model to determine a desired vehicle motion, mainly as an expected or desired yaw rate. If the measured motion (yaw rate) deviates from the desired yaw rate by more than some threshold (e.g., 3 deg/s as a random example), then the ESC 154 may be activated to operate the vehicle stabilization 314 operations. Trailer braking then may be applied to individual trailer wheels to urge the vehicle in a desired direction.

Figure 4B:
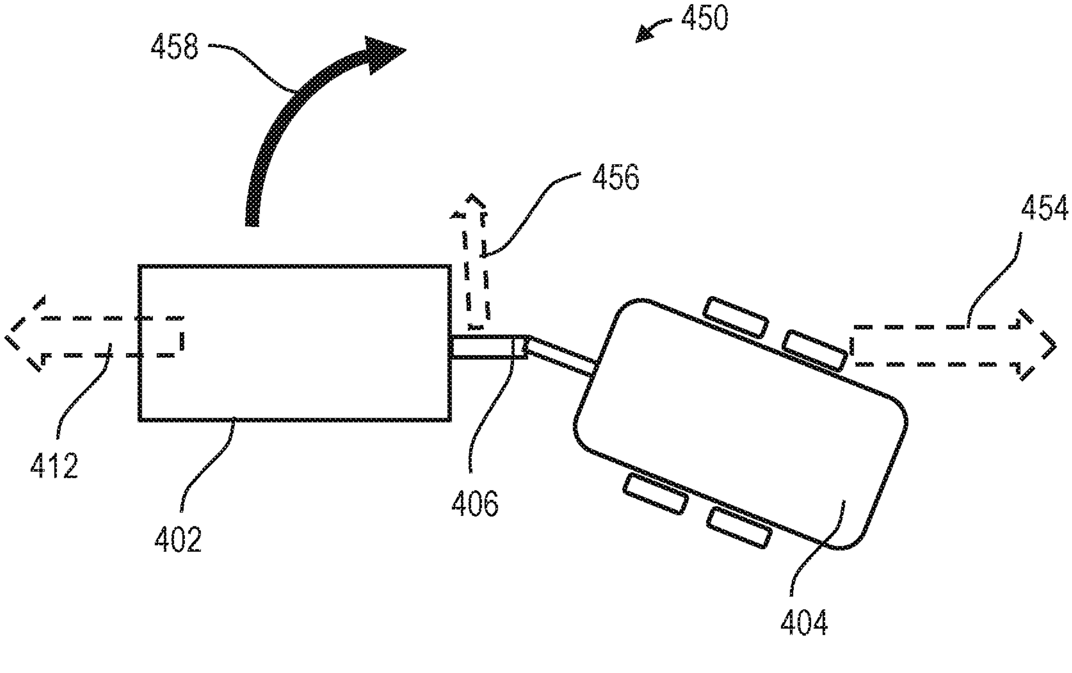
FIG. 4B is a schematic diagram showing a vehicle pulling a trailer to explain vehicle stabilization according to at least one of the example implementations herein.
Figure 5:
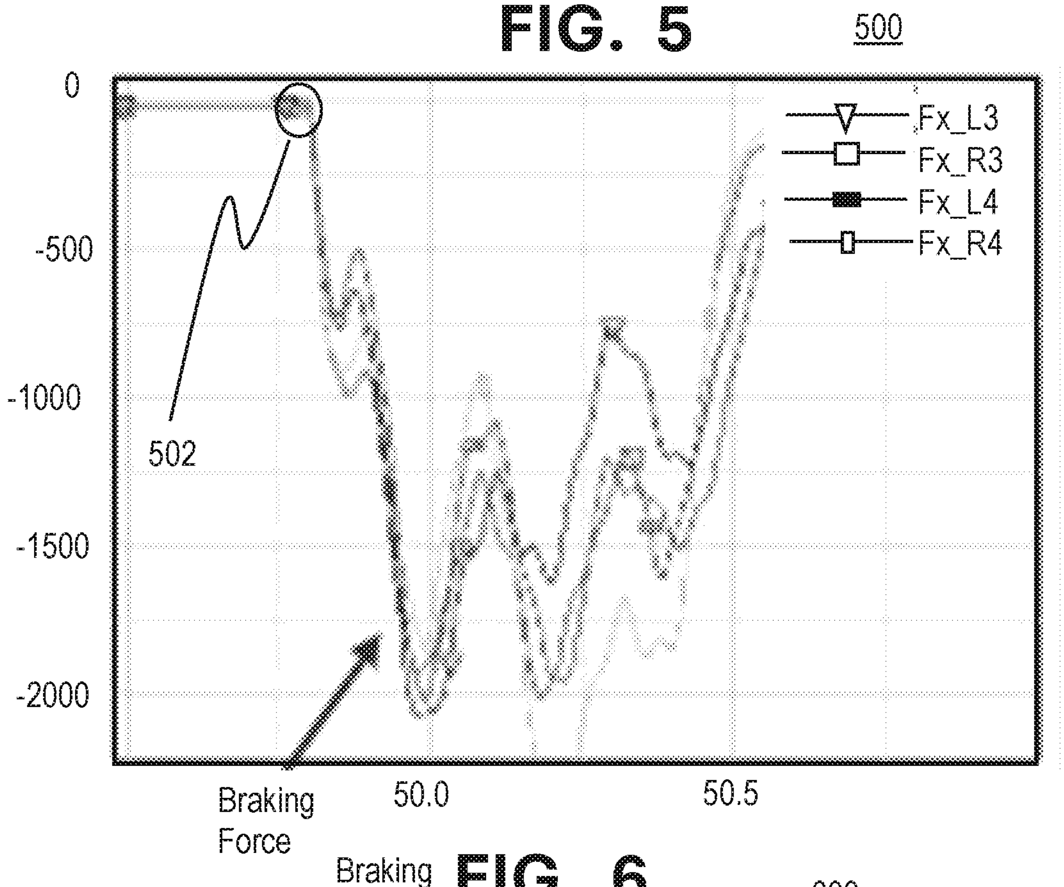
FIG. 5 is a graph showing braking force on a light trailer according to at least one of the example implementations herein.
Figure 6:
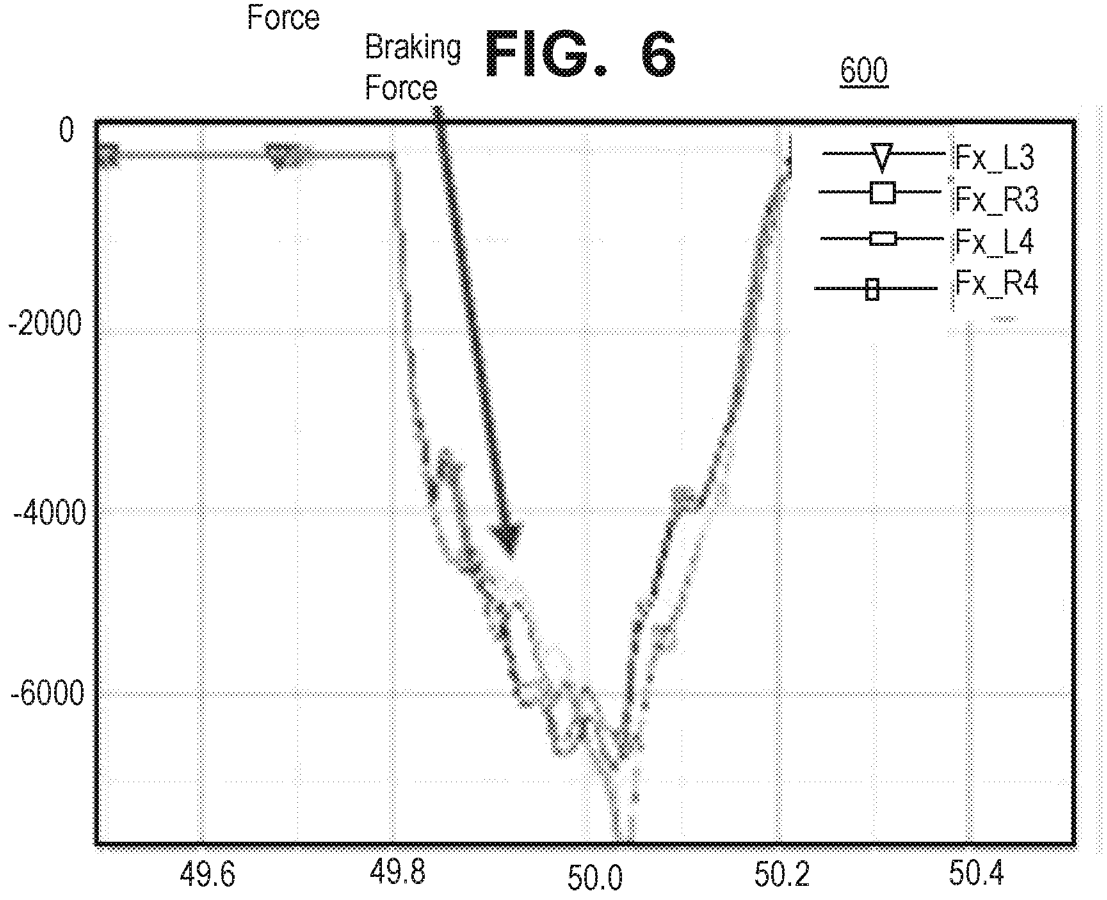
FIG. 6 is a graph showing braking force on a heavy trailer according to at least one of the example implementations herein.
Figure 7:
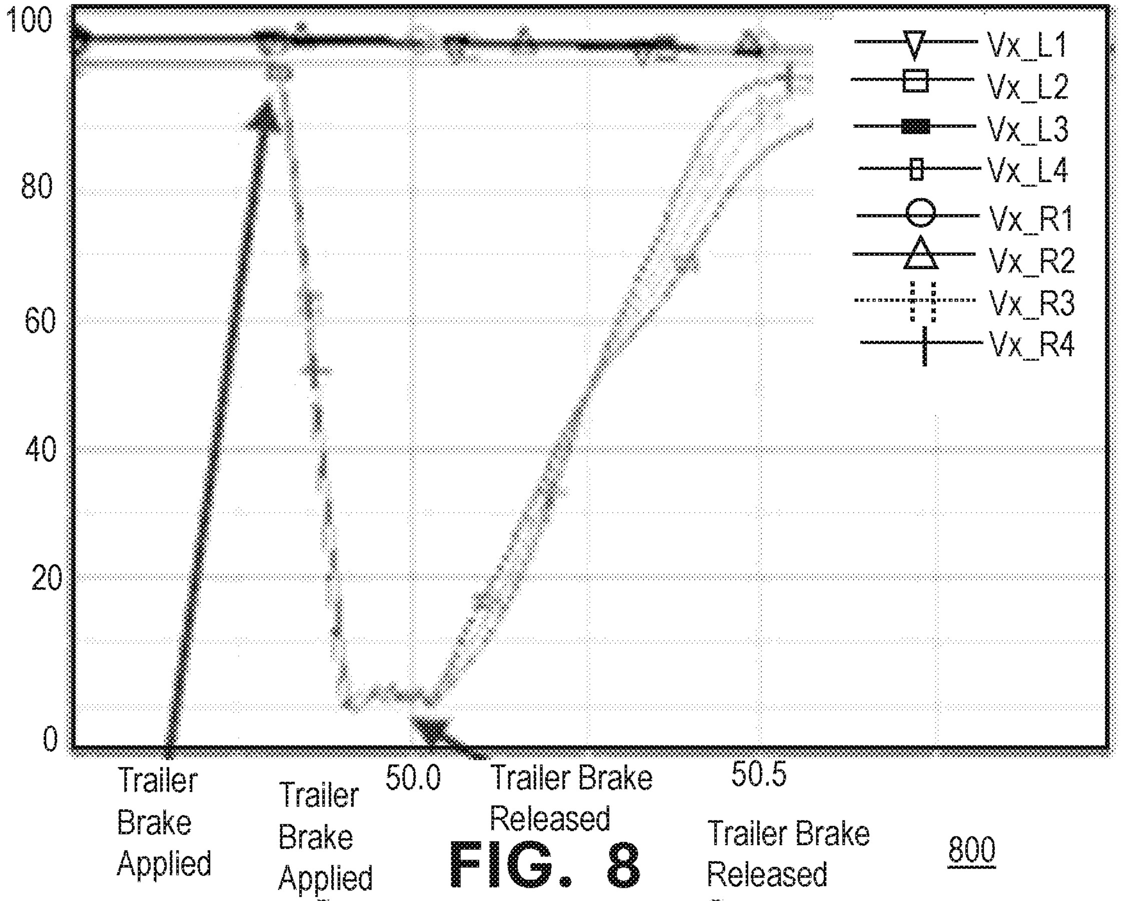
FIG. 7 is a graph showing velocity of the light trailer during the braking of FIG. 5 according to at least one of the example implementations herein.
Figure 8:
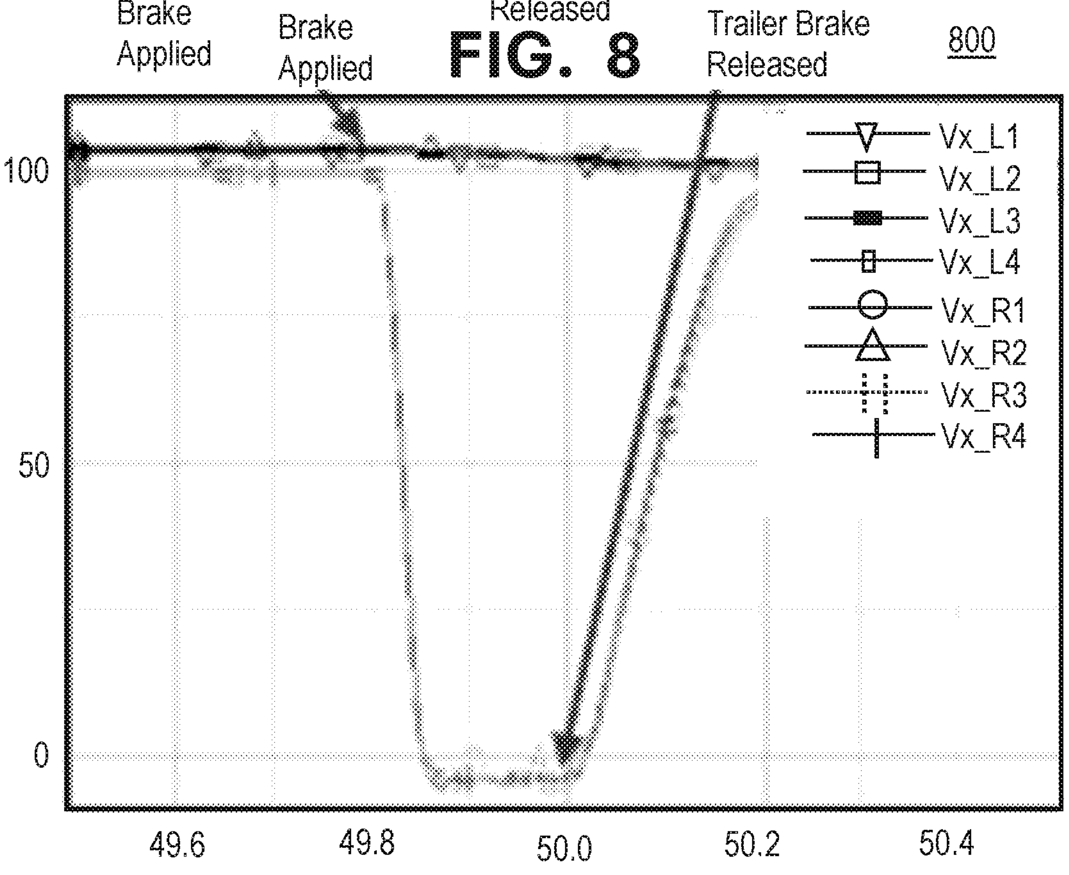
FIG. 8 is a graph showing velocity of the heavy trailer during the braking of FIG. 6 according to at least one of the example implementations herein.
Figure 9:
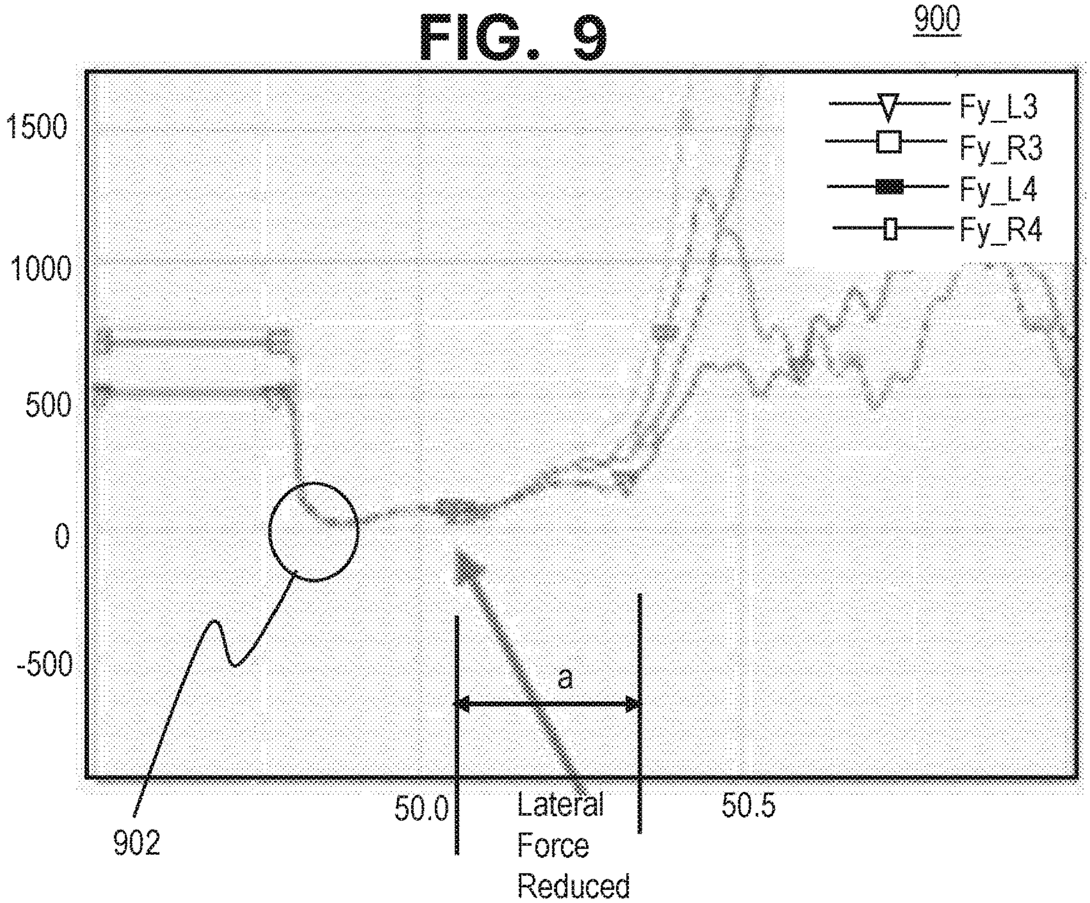
FIG. 9 is a graph showing lateral force of the light trailer during the braking of FIG. 5 according to at least one of the example implementations herein.
Figure 10:
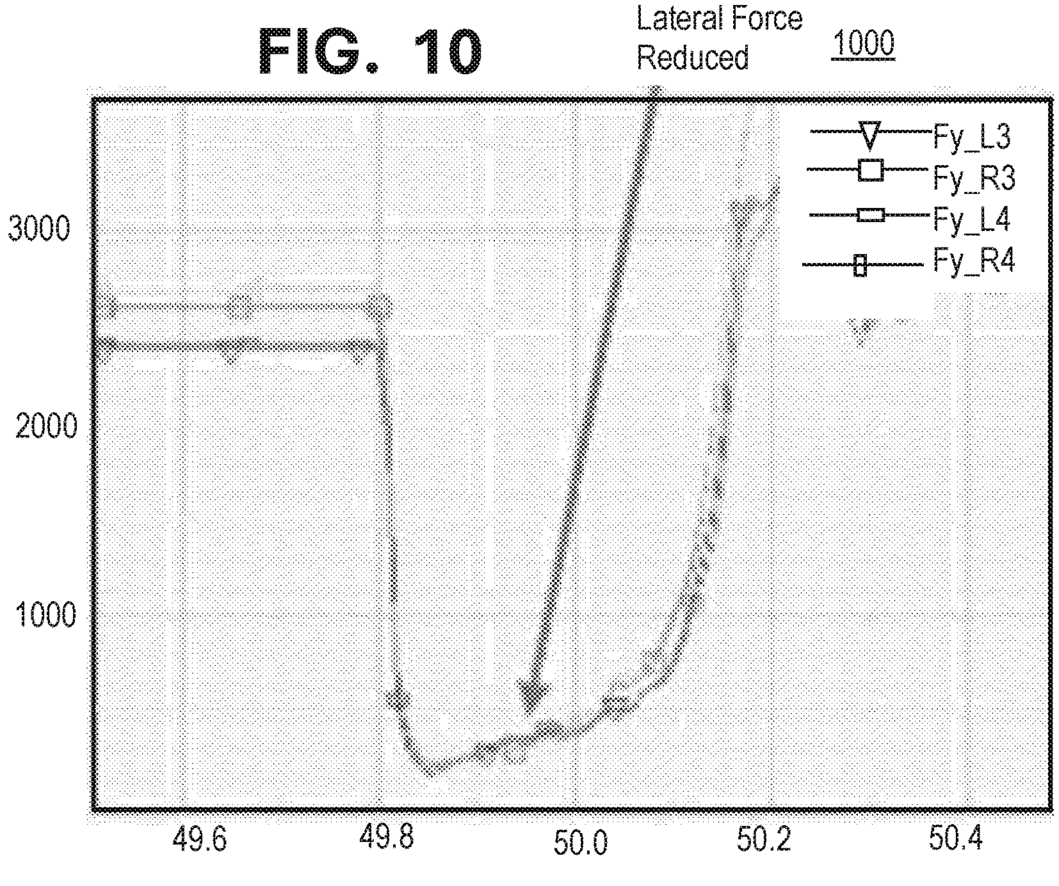
FIG. 10 is a graph showing lateral force of the heavy trailer during the braking of FIG. 6 according to at least one of the example implementations herein.

Referring to FIG. 4B as an example, a trailering dynamics condition 450 that is a vehicle instability condition is shown with features similar to that in FIG. 4A numbered similarly. Here, the vehicle 402 is unstable while the trailer 404 remains stable. In this situation, and when the hitch angle is non-zero as shown at hitch 406, herein this is included within "trailer dynamics between the trailer and the vehicle". In other words, either the vehicle or the trailer may actually be yawing relative to the other and unstable while the other is stable. By a rough approximation, braking the trailer in this trailer dynamics condition will apply a reverse force 454 to the trailer which is transmitted to the vehicle through hitch 406 to urge the vehicle rearward despite a forward propagation force 412. Due to the non-zero articulation of the hitch angle between the trailer and the vehicle, the hitch 406 causes a lateral force or moment 456 to be applied to the vehicle even though the trailer brake force is longitudinal to the hitch. Thus, when the trailer 404 is to a left of the vehicle 402 as shown, braking the trailer will result in a hitch force transmitted into the vehicle and urging the vehicle clockwise as shown by arrow 458. This may result in the vehicle 402 yawing toward the right to stabilize and straighten out relative to the trailer.

Thus, to activate the vehicle stabilization 314 then, the main, and by some forms the only, yaw detection factor is whether the vehicle is yawing or moving rotationally and that is not an expected or desired yaw, particularly during an evasive maneuver. It does not matter whether brakes are being applied when deciding whether to activate the vehicle stabilization process. Thus, this is an attempt to gain stability control of the vehicle merely by attempting to predict where the driver is trying to point the vehicle and then performing the trailer braking to assist with the redirection of the vehicle.

As a preliminary matter, however, process 300 may include "compare vehicle to trailer total size or vertical load proportion to a criterion" 346. In other words, for this vehicle stabilization strategy to work, the trailer must be of a size (or have sufficient braking force $F_x$) that causes a sufficient amount of transmitted braking (or hitch) force to affect the motion of the vehicle. Thus, if a large vehicle is towing a relatively small trailer, applying the brakes on the trailer may be insignificant and ineffective to affect the lateral forces at the vehicle. This may be determined by using predetermined vehicle-trailer weight ratios or proportions, for example.

When the vehicle to trailer sizes or braking force is acceptable, process 300 may include "determine difference of actual and expected vehicle yaw rates" 348. In the case of automated driving, the desired or expected vehicle behavior may be derived from driver inputs and/or a motion planner. Thus, by one example form, the ADAS 156 may have a motion planner that uses an environment model (from perception) and object predictions to plan a comfortable, efficient path (or trajectory) over time. The ADAS 156 may consider vehicle dynamics, traffic rules, and obstacle avoidance. Examples of motion planning algorithms in ADAS may include polynomial planners or splines for smooth trajectories, sampling-based planners such as Rapidly-exploring Random Tree (RRT), and/or optimization-based planners such as Model Predictive Control (MPC). These motion planners may output trajectories in terms of: X/Y coordinates and heading, speed profile and curvature, constraints such as acceleration, jerk, yaw rate limits, and so forth. Many variations are contemplated.

Process 300 may include "determine if difference meets vehicle instability criteria" 350, and by one example approach by the following threshold equations:

$$\text{Brake trailer} \Leftarrow \begin{cases} |\omega z - \omega zdes| > h, \text{ and} \\ \omega z - \omega zdes > 0, \text{ and} \\ \theta > 0 \end{cases} \tag{16}$$

-continued $$\text{Brake trailer} \Leftarrow \begin{cases} |\omega z - \omega zdes| > h, \text{ and} \\ \omega z - \omega zdes < 0, \text{ and} \\ \theta < 0 \end{cases} \quad (17)$$

where h is a vehicle yaw rate difference threshold that indicates whether the vehicle is unstable, the yaw variable oz is the actual vehicle yaw rate and that is positive in a counterclockwise direction, and the yaw variable ωzdes is the expected or desired vehicle yaw rate. The hitch angle θ may be determined as mentioned above. When the difference in yaw rates are greater than h (for either equation 16 or 17), and when equation (16) is true, the vehicle is yawing significantly to the left, and when equation (17) is true, the vehicle is yawing significantly to the right. The desired vehicle yaw rate may be obtained from the ADAS 156 as mentioned, while the actual vehicle yaw rate may be determined by using yaw rate sensors mentioned above. The threshold h also may be determined by experimentation.

Process 300 may include the inquiry "activate vehicle stabilization?" 352, where when either equation 16 or equation 17 is found to be true, and the difference between desired and actual vehicle yaw rate is deemed to be significant indicating an unstable vehicle, then the process 314 proceeds to determine a trailer braking strategy to implement and then implements that strategy.

For example, process 300 then may include "if the vehicle is unstable, obtain left-right yaw direction of trailer" 354, and this is performed as mentioned above by using the vehicle sensors and/or equations (16) and (17) directly.

Process 300 may include "control trailer brake to apply hitch force on vehicle" 356, where the greater the trailer brake output level, the greater the reverse and lateral force the trailer applies to the vehicle. The amounts of force may be predetermined by experimentation. The application of the trailer brakes, as well as coordination with application of the vehicle brakes 106, is performed by having the vehicle stabilizer unit 210 and/or the ADAS 156 and ESC 154 provide braking signals to the vehicle controller 140, which then sends signals to have the trailer brake control 166 control the trailer brakes accordingly.

In various implementations, a determination may be made as to whether the trailer dynamics control process is to continue. In certain implementations, the processor 142 of FIG. 1 determines whether the process is to continue, for example based upon whether a vehicle drive or ignition cycle is ongoing. In various implementations, if it is determined that the process is to continue, then the process returns to operation 304, as updated sensor data is collected and utilized in a new iteration. Conversely, in various implementations, if it is instead determined that the process is not to continue, then the process terminates.

The present method and system provide an ADAS and/or ESC system with significant additional control capability for trailer dynamics control. To reach higher levels of driver assistance, especially to prevent excessive yaw events, the ADAS disclosed herein further may control the trailer brakes beyond the braking action afforded through tied vehicle brakes. The present system and method also may improve towing without undesired events, longitudinal control robustness, lateral control robustness, and increased automated control of the trailer by the vehicle.

Accordingly, methods, systems, and vehicles are provided for mitigation of trailer dynamics in vehicle/trailer systems. In various implementations, a band-pass filter is applied to hitch articulation angle and vehicle yaw rate in order to mitigate trailer dynamics under appropriate circumstances. In various implementations, this can help lead to quicker detection of trailer sway, and can also therefore result in potentially larger trailer loads in various implementations.

It will be appreciated that the systems, vehicles, and methods may vary from those depicted in the Figures and described herein. For example, the vehicle 100 and/or trailer 101 of FIG. 1, the control system 102 and/or components thereof of FIG. 1 may vary in different implementations. It will similarly be appreciated that the operations of the process 300 by the system 200 may differ from those depicted in FIGS. 2 and 3A-3D, and/or that various operations of the process 300 may occur concurrently and/or in a different order than that depicted in FIGS. 3A-3D. It will similarly be appreciated that the various implementations of FIGS. 2, 3A-3D, and 4A-4B may also differ in various implementations.

While at least one example implementation has been presented in the foregoing detailed description, it should be appreciated that a vast number of variations exist. It should also be appreciated that the example implementation or example implementations are only examples, and are not intended to limit the scope, applicability, or configuration of the disclosure in any way. Rather, the foregoing detailed description will provide those skilled in the art with a convenient road map for implementing the example implementation or example implementations. It should be understood that various changes can be made in the function and arrangement of elements without departing from the scope of the disclosure as set forth in the appended claims and the legal equivalents thereof.

What is claimed is:

1. A method comprising:

monitoring, by at least one processor, parameters related to a position and motion of a vehicle and a trailer being towed by the vehicle, and monitored by using sensors on the vehicle, the trailer, or both the vehicle and the trailer;

detecting, by at least one processor, at least one of a plurality of predetermined trailering dynamics conditions each being associated with a trailer braking algorithm to control trailer and vehicle dynamics relative to each other; and automatically controlling, by at least one processor, at least one trailer brake of a plurality of trailer brakes of the trailer controlled separately from brakes of the vehicle, wherein the controlling comprises having all three available of (1) setting at least one trailer brake ramping rate, (2) setting at least one trailer brake output level, and (3) both (1) and (2), wherein the controlling depends on which of the predetermined trailering dynamics conditions is detected, wherein the trailer braking algorithm is a saturation avoidance algorithm that includes computing a saturation threshold as a maximum longitudinal brake force, and wherein the controlling comprises maintaining trailer brake output levels below the saturation threshold, wherein the saturation threshold is based on a maximum potential lateral force when a longitudinal brake force is zero, and wherein the saturation threshold is based on a calculated residual force margin derived by subtracting a version of the maximum potential lateral force from a vertical load-dependent combined force capacity, and factoring a longitudinal stiffness value and a cornering stiffness value.

2. The method of claim 1, wherein at least one of the plurality of predetermined trailering dynamics conditions is a trailer dynamics condition that comprises a detection that one or more of the plurality of trailer brakes are saturated, and the controlling comprises automatically stopping trailer braking or reducing a brake output level of one or more of the plurality of trailer brakes.

3. The method of claim 1, wherein one of the predetermined trailering dynamics conditions is a predetermined trailer dynamics condition that is set to exist when a lateral acceleration of the trailer and a velocity of the vehicle are both over predetermined thresholds, and the controlling comprises automatically changing a trailer brake output level or setting a trailer brake ramping rate in response to the predetermined trailer dynamics condition.

4. The method of claim 1, wherein one of the predetermined trailering dynamics conditions is a vehicle instability condition, and wherein the trailer braking algorithm is a vehicle stabilization algorithm that provides criteria to determine when to automatically apply at least one of the plurality of trailer brakes to generate a force transmitted from the trailer and to the vehicle resulting in the vehicle moving laterally from an actual yaw and toward an expected yaw of the vehicle.

5. The method of claim 4, wherein the criteria include at least a first threshold of a hitch angle between the trailer and the vehicle and a second threshold of a difference between the actual yaw and the expected yaw of the vehicle.

6. The method of claim 1, wherein the trailer braking algorithm is a trailer stabilization algorithm that provides criteria to determine when to stop, start, increase, decrease, or maintain a trailer brake level or a trailer brake ramping rate to shift the trailer laterally toward a centered position that follows a centerline of motion of the vehicle.

7. The method of claim 6, wherein the trailer stabilization algorithm causes one or more of the plurality of trailer brakes to be applied depending on a direction of lateral motion of the trailer relative to the centered position.

8. The method of claim 7, wherein the trailer stabilization algorithm causes reduction in trailer brake output level or stopping of application of one or more of the plurality of trailer brakes in response to determining the trailer is moving laterally inward toward the centered position, and causes the plurality of trailer brakes to be applied, maintained at an existing trailer brake output level, or applied with an increased trailer brake output level in response to determining the trailer is moving laterally outward away from the centered position.

9. The method of claim 7, wherein the trailer stabilization algorithm causes increase in trailer brake output level or stopping of application of one or more of the plurality of trailer brakes in response to determining the trailer is moving laterally inward toward the centered position with a lateral acceleration that will cause the trailer to overshoot the centered position and continue to yaw outward away from the centered position.

10. The method of claim 6, wherein the criteria is arranged to factor both a hitch angle between the vehicle and the trailer, and a hitch angle rate that is a difference between a vehicle yaw rate and a trailer yaw rate.

11. The method of claim 1, wherein the saturation threshold is arranged to factor a trailer brake factor determined so that the longitudinal brake force is limited to reduction by the trailer brake factor, wherein the trailer brake factor varies depending on a current predetermined trailer dynamics condition.

12. A system, comprising:

sensors on a vehicle, a trailer being towed by the vehicle, or both that provide data of parameters related to a position and motion of the vehicle;

memory; and processor circuitry forming at least one processor communicatively coupled to the sensors and the memory, and being arranged to operate by:

detecting at least one of a plurality of predetermined trailering dynamics conditions each being associated with a trailer braking algorithm to control trailer and vehicle dynamics relative to each other, wherein the predetermined trailering dynamics conditions include at least all of:

a trailer brake saturation condition, a vehicle unstable condition, a trailer unstable condition, and an evasive maneuver condition, and automatically controlling at least one trailer brake of multiple trailer brakes of the trailer controlled separately from brakes of the vehicle, wherein the controlling comprises having all three available of (1) setting at least one trailer brake ramping rate, (2) setting at least one trailer brake output level, and (3) both (1) and (2), wherein the controlling depends on which of the predetermined trailering dynamics conditions is detected, wherein the trailer braking algorithm is a saturation avoidance algorithm that includes computing a saturation threshold as a maximum longitudinal brake force, and wherein the controlling comprises maintaining trailer brake output levels below the saturation threshold, wherein the saturation threshold is based on a maximum potential lateral force when a longitudinal brake force is zero, and wherein the saturation threshold is based on a calculated residual force margin derived by subtracting a version of the maximum potential lateral force from a vertical load-dependent combined force capacity, and factoring a longitudinal stiffness value and a cornering stiffness value.

13. The system of claim 12, wherein the at least one processor is arranged to operate by increasing application of one or more of the multiple trailer brakes to intentionally alter trailer dynamics in distance or force, and to shift the trailer toward a centered position of the trailer aligned with a vehicle path.

14. The system of claim 12, wherein the detecting of the predetermined trailering dynamics conditions includes detecting the left or right direction of yaw of the trailer relative to the vehicle, and initiating a trailer brake response differently depending on the detected left or right direction.

15. A vehicle arranged to tow a trailer, the vehicle comprising:

sensors on the vehicle, the trailer, or both that provide data of parameters related to a position and motion of the vehicle;

memory; and processor circuitry forming at least one processor communicatively coupled to the sensors and the memory, and being arranged to operate by:

detecting at least one of a plurality of predetermined trailering dynamics conditions each being associated with a trailer braking algorithm to control trailer and vehicle dynamics relative to each other, wherein the predetermined trailering dynamics conditions include at least all of:

a trailer brake saturation condition, a vehicle unstable condition depending on a hitch angle and yaw rates of the vehicle, a trailer unstable condition that is different depending on whether the trailer is yawing laterally toward or away from a centered position of the trailer, and an evasive maneuver condition, and automatically controlling at least one trailer brake of multiple trailer brakes of the trailer controlled separately from brakes of the vehicle, wherein the controlling comprises having all three available of (1) setting at least one brake ramping rate, (2) setting at least one brake output level, and (3) both (1) and (2), wherein the controlling depends on which of the predetermined trailering dynamics conditions is detected, wherein the trailer braking algorithm is a saturation avoidance algorithm that includes computing a saturation threshold as a maximum longitudinal brake force, and wherein the controlling comprises maintaining trailer brake output levels below the saturation threshold, wherein the saturation threshold is based on a maximum potential lateral force when a longitudinal brake force is zero, and wherein the saturation threshold is based on a calculated residual force margin derived by subtracting a version of the maximum potential lateral force from a vertical load-dependent combined force capacity, and factoring a longitudinal stiffness value and a cornering stiffness value.

16. The vehicle of claim 15, wherein the at least one processor is arranged to operate by using a saturation trailer brake output level determined by decreasing trailer brake output levels until tire saturation is observed by using the hitch angle, trailer yaw data, or both; and wherein the at least one processor is arranged to operate by using a peak lateral load to determine how much lateral load to reduce from the peak lateral load to avoid the tire saturation, and wherein the peak lateral load is determined by increasing the trailer brake output levels and monitoring reactions of the vehicle and the trailer.

17. The vehicle of claim 15, comprising a display and an audio system, wherein the at least one processor is arranged to announce trailer instability on the display or on the audio system on the vehicle, and when trailer dynamics are detected.

* * * * *